(12) United States Patent
Wang et al.

(10) Patent No.: US 11,818,338 B2
(45) Date of Patent: Nov. 14, 2023

(54) SUBLAYERS INFORMATION IN VIDEO CODING

(71) Applicant: Bytedance Inc., Los Angeles, CA (US)

(72) Inventors: Ye-kui Wang, San Diego, CA (US); Li Zhang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/975,023

(22) Filed: Oct. 27, 2022

(65) Prior Publication Data

US 2023/0057986 A1    Feb. 23, 2023

Related U.S. Application Data

(63) Continuation of application No. PCT/US2021/028979, filed on Apr. 23, 2021.

(60) Provisional application No. 63/016,122, filed on Apr. 27, 2020.

(51) Int. Cl.
*H04N 19/105* (2014.01)
*H04N 19/172* (2014.01)
*H04N 19/174* (2014.01)
*H04N 19/70* (2014.01)

(52) U.S. Cl.
CPC ......... *H04N 19/105* (2014.11); *H04N 19/172* (2014.11); *H04N 19/174* (2014.11); *H04N 19/70* (2014.11)

(58) Field of Classification Search
CPC ... H04N 19/105; H04N 19/172; H04N 19/174
See application file for complete search history.

(56) References Cited

U.S. PATENT DOCUMENTS

| | | |
|---|---|---|
| 2005/0135783 A1 | 6/2005 | Crinon |
| 2012/0269275 A1 | 10/2012 | Hannuksela |
| 2013/0272430 A1 | 10/2013 | Sullivan et al. |
| 2014/0294062 A1 | 10/2014 | Chen et al. |
| 2016/0249056 A1 | 8/2016 | Tsukuba et al. |

(Continued)

OTHER PUBLICATIONS

Brass et al. Versatile Video Coding (Draft 9), Joint Video Experts Team (JVET) of ITU-T SG 16 WP 3 and ISO/IEC JTC 1/SC 29/WG 11 18th Meeting: by teleconference, Apr. 15-24 (Year: 2020).*

(Continued)

*Primary Examiner* — Fabio S Lima
(74) *Attorney, Agent, or Firm* — Conley Rose, P.C.

(57) ABSTRACT

Methods and apparatus for processing of video are described. A video processing method includes performing a conversion between a video including multiple layers of one or more pictures and a bitstream of the video according to a format rule. The format rule specifies that a reference picture referred to by each inter-layer reference picture entry in a reference picture list of a slice of a current picture of a current layer satisfies a constraint. The constraint is at least one of: (a) the reference picture is an intra random access (IRAP) picture or (b) the reference picture has a temporal identifier that is less than or equal to a certain value that is a function of a maximum allowed value of a video layer to which slices from the current layer can reference. The maximum allowed value is indicated in a syntax element.

20 Claims, 10 Drawing Sheets

(56) References Cited

U.S. PATENT DOCUMENTS

| | | | |
|---|---|---|---|
| 2017/0064336 | A1 | 3/2017 | Zhang et al. |
| 2017/0111649 | A1 | 4/2017 | Wang et al. |
| 2017/0195670 | A1 | 7/2017 | Budagavi |
| 2018/0199051 | A1 | 7/2018 | Hannuksela et al. |
| 2020/0074503 | A1 | 3/2020 | Helle et al. |
| 2020/0074687 | A1 | 3/2020 | Lin et al. |
| 2020/0077105 | A1 | 3/2020 | Hannuksela |
| 2020/0228843 | A1 | 7/2020 | Lin et al. |
| 2021/0258587 | A1* | 8/2021 | Lai ................. H04N 19/1883 |
| 2022/0286685 | A1* | 9/2022 | Hendry ............. H04N 19/14 |
| 2023/0007291 | A1* | 1/2023 | Samuelsson ....... H04N 19/31 |
| 2023/0057986 | A1* | 2/2023 | Wang ............... H04N 19/172 |

OTHER PUBLICATIONS

"Series H: Audiovisual and Multimedia Systems Infrastructure of audiovisual services—Coding of moving video High efficiency video coding," Recommendation ITU-T H.265 | ISO/IEC 23008-2 (in force edition), Nov. 2019, 712 pages.

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Bossen, F., Retrieved from the internet: https://vcgit.hhi.fraunhofer.de/jvet/VVCSoftware_VTM.git, VTM software, Oct. 18, 2022, 3 pages.

Document: JVET -R0193-r1, Hendry, et al., "AHG8/AHG9: On signalling of syntax element max_tid_il_ref_pics_plus1," Joint Video Experts Team (JVET) of ITU-T SG 16 WP 3 and ISO/IEC JTC 1/SC 29/WG 11 18th Meeting: by teleconference, Apr. 15-24, 2020, 6 pages.

Document: JVET-R0046-v4, Lai, C., et al., "AHG8: Temporal sublayer requirements for multi-layer referencing," Joint Video Experts Team (JVET) of ITU-T SG 16 WP 3 and ISO/IEC JTC 1/SC 29/WG 11 18th Meeting: by teleconference, Apr. 15-24, 2020, 5 pages.

Document: JVET-R0266, He, Y., et al., "AHG9: Miscellaneous HLS topics," Joint Video Experts Team (JVET) of ITU-T SG 16 WP 3 and ISO/IEC JTC 1/SC 29/WG 11 18th Meeting: by teleconference, Apr. 15-24, 2020, 5 pages.

"Series H: Audiovisual and Multimedia Systems Infrastructure of audiovisual services—Coding of moving video Versatile video coding," Recommendation ITU-T H.266 | ISO/IEC 23090-3, Aug. 2020, 516 pages.

Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.

"Series H: Audiovisual and Multimedia Sys 1 EMS Infrastructure of audiovisual services—Coding of moving video Versatile supplemental enhancement information messages for coded video bitstreams," Recommendation ITU-T Rec. H.274 | ISO/IEC 23002-7, Aug. 2020, 86 pages.

Document: JVET-S2007-v7, Boyce, J., et al., "Versatile supplemental enhancement information messages for coded video bitstreams (Draft 5)," Joint Video Experts Team (JVET) of ITU-T SG 16 WP 3 and ISO/IEC JTC 1/SC 29/WG 11 18th Meeting: by teleconference, Apr. 15-24, 2020, 85 pages.

Foreign Communication From a Related Counterpart Application, PCT Application No. PCT/US2021/028979, International Search Report dated Aug. 3, 2021, 18 pages.

Foreign Communication From a Related Counterpart Application, PCT Application No. PCT/US2021/028983, International Search Report dated Jul. 21, 2021, 17 pages.

Foreign Communication From a Related Counterpart Application, PCT Application No. PCT/US2021/023595, International Search Report dated Jun. 7, 2021, 11 pages.

Foreign Communication From a Related Counterpart Application, Indian Application No. 202247068089, Indian Office Action dated Feb. 2, 2023, 6 pages.

\* cited by examiner

1100 —→

1102 — Performing a conversion between a video comprising multiple layers of one or more pictures and a bitstream of the video according to a format rule, and wherein the format rule specifies that a reference picture referred to by each inter-layer reference picture entry in a reference picture list of a slice of a current picture of a current layer satisfies a constraint, wherein the constraint is at least one of: (a) the reference picture is an intra random access (IRAP) picture or (b) the reference picture has a temporal identifier that is less than or equal to a certain value that is a function of a maximum allowed value of a video layer to which slices from the current layer can reference, wherein the maximum allowed value is indicated in a syntax element.

FIG. 11

SUBLAYERS INFORMATION IN VIDEO CODING

CROSS REFERENCE TO RELATED APPLICATIONS

This application is a continuation of International Patent Application No. PCT/US2021/028979 filed on Apr. 23, 2021, which claims the priority to and benefits of U.S. Provisional Patent Application No. 63/016,122 filed on Apr. 27, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses techniques that can be used by video encoders and decoders for processing coded representation of video using various rules of syntax.

In one example aspect, a video processing method is disclosed. The method includes performing a conversion between a video comprising one or more pictures comprising one or more subpictures and a coded representation of the video. The coded representation conforms to a format rule that specifies that the one or more pictures comprising one or more subpictures are included in the coded representation according to network abstraction layer (NAL) units, wherein a type NAL unit is indicated in the coded representation includes a coded slice of a particular type of picture or a coded slice of a particular type of a subpicture.

In another example aspect, another video processing method is disclosed. The method includes performing a conversion between a video comprising one or more pictures comprising one or more subpictures and a coded representation of the video, wherein the coded representation conforms to a format rule that specifies that two neighboring subpictures with different network abstraction layer unit types will have a same indication of subpictures being treated as pictures flag.

In another example aspect, another video processing method is disclosed. The method includes performing a conversion between a video comprising one or more pictures comprising one or more subpictures and a coded representation of the video, wherein the coded representation conforms to a format rule that defines an order of a first type of subpicture and a second type of subpicture, wherein the first subpicture is a trailing subpicture or a leading subpicture or a random access skipped leading (RASL) subpicture type and the second subpicture is of the RASL type or a random access decodable leading (RADL) type or an instantaneous decoding refresh (IDR) type or a gradual decoding refresh (GDR) type subpicture.

In another example aspect, another video processing method is disclosed. The method includes performing a conversion between a video comprising one or more pictures comprising one or more subpictures and a coded representation of the video, wherein the coded representation conforms to a format rule that defines a condition under which a first type of subpicture is allowed or disallowed to occur with a second type of subpicture.

In another example aspect, another video processing method is disclosed. The method includes performing a conversion between a video comprising multiple layers of one or more pictures and a bitstream of the video according to a format rule, and wherein the format rule specifies that a reference picture referred to by each inter-layer reference picture entry in a reference picture list of a slice of a current picture of a current layer satisfies a constraint, wherein the constraint is at least one of: (a) the reference picture is an intra random access (IRAP) picture or (b) the reference picture has a temporal identifier that is less than or equal to a certain value that is a function of a maximum allowed value of a video layer to which slices from the current layer can reference, wherein the maximum allowed value is indicated in a syntax element.

In another example aspect, another video processing method is disclosed. The method includes performing a conversion between a video comprising video pictures and a bitstream according to a format rule, wherein the format rule specifies that virtual boundaries of a video region of a video picture are indicated using one or more of a first syntax structure that indicates positions of vertical virtual boundaries and a second syntax structure that indicates positions of horizontal virtual boundaries, wherein the format rule specifies that numerical values indicated by first syntax elements in the first syntax structure and second syntax elements in the second syntax structure are one less than positions of the vertical virtual boundaries and the horizontal virtual boundaries counted from a top left position of the video picture.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present disclosure.

BRIEF DESCRIPTION OF DRAWINGS

FIG. 11 is a flowchart for an example method of video processing based on some implementations of the disclosed technology.

DETAILED DESCRIPTION

Figure 2:
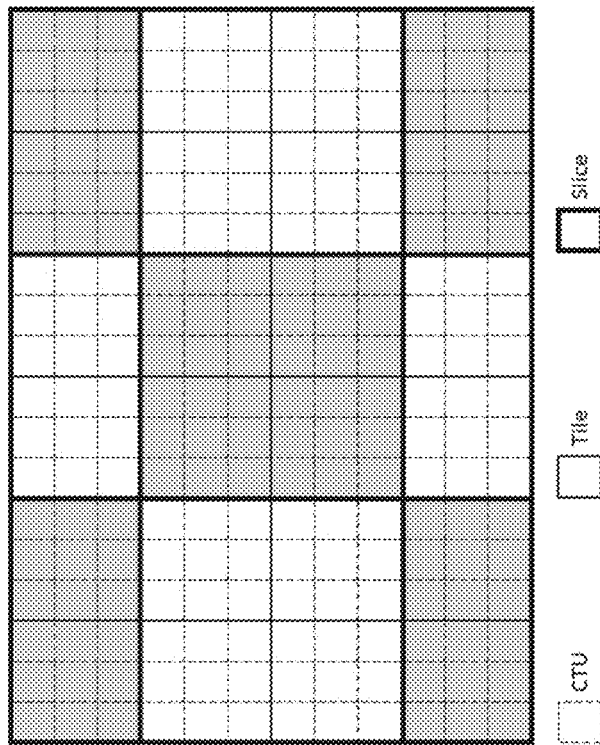
FIG. 2 shows an example of rectangular slice partitioning of a picture, where the picture is divided into 24 tiles (6 tile columns and 4 tile rows) and 9 rectangular slices.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present disclosure, editing changes are shown to text by strikethrough indicating cancelled text and highlight indicating added text (including boldface italic), with respect to the current draft of the versatile video coding (VVC) specification.

1. INTRODUCTION

This disclosure is related to video coding technologies. Specifically, it is about the definitions of subpicture types and the relationships in terms of decoding order, output order, and prediction relationship between different types of subpictures, in both single-layer and multi-layer contexts. The key is to clearly specify the meaning of mixed subpicture types within a picture through a set of constraints on decoding order, output order, and prediction relationship. The ideas may be applied individually or in various combination, to any video coding standard or non-standard video codec that supports multi-layer video coding, e.g., the being-developed Versatile Video Coding (VVC).

2. ABBREVIATIONS

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
CVSS CVS Start
DCI Decoding Capability Information
DPB Decoded Picture Buffer
DU Decoding Unit
EOB End Of Bitstream
EOS End Of Sequence
FD Filler Data
GDR Gradual Decoding Refresh
HEVC High Efficiency Video Coding
HRD Hypothetical Reference Decoder
IDR Instantaneous Decoding Refresh
ILRP Inter-Layer Residual Prediction
JEM Joint Exploration Model
MCTS Motion-Constrained Tile Sets
NAL Network Abstraction Layer
NUT NAL Unit Type
OLS Output Layer Set
PH Picture Header
PPS Picture Parameter Set
PTL Profile, Tier and Level
PU Picture Unit
RADL Random Access Decodable Leading (Picture)
RAP Random Access Point
RASL Random Access Skipped Leading (Picture)
RBSP Raw Byte Sequence Payload
RPL Reference Picture List
RSV Reserved
SEI Supplemental Enhancement Information
SPS Sequence Parameter Set
STSA Step-wise Temporal Sublayer Access
SVC Scalable Video Coding
VCL Video Coding Layer
VPS Video Parameter Set
VTM VVC Test Model
VUI Video Usability Information
VVC Versatile Video Coding

3. INITIAL DISCUSSION

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Picture Partitioning Schemes in HEVC

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiply by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y. K. Wang (editors), "HEVC Additional Supplemental Enhancement Information (Draft 4)," Oct. 24, 2017, publicly available herein: http://phenix.int-evry.fr/jct/doc_end_user/documents/29_Macau/wg11/JCTVC-AC1005-v2.zip. With this amendment included, HEVC specifies three MCTS-related SEI messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.2. Partitioning of Pictures in VVC

In VVC, a picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 1:
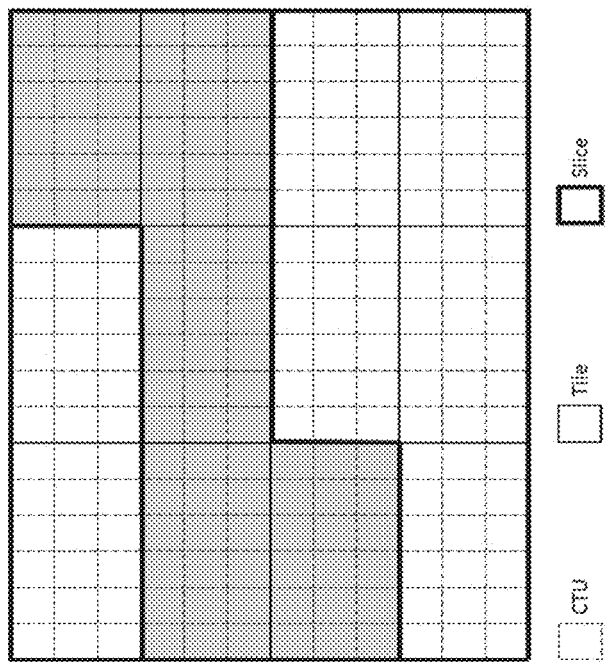
FIG. 1 shows an example of raster-scan slice partitioning of a picture, where the picture is divided into 12 tiles and 3 raster-scan slices.

FIG. 1 shows an example of raster-scan slice partitioning of a picture, where the picture is divided into 12 tiles and 3 raster-scan slices.

FIG. 2 shows an example of rectangular slice partitioning of a picture, where the picture is divided into 24 tiles (6 tile columns and 4 tile rows) and 9 rectangular slices.

Figure 3:
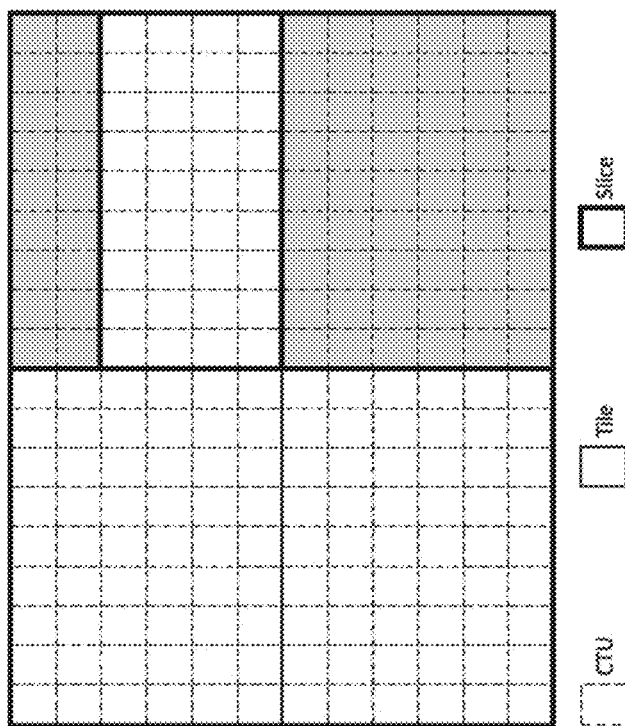
FIG. 3 shows an example of a picture partitioned into tiles and rectangular slices, where the picture is divided into 4 tiles (2 tile columns and 2 tile rows) and 4 rectangular slices.

FIG. 3 shows an example of a picture partitioned into tiles and rectangular slices, where the picture is divided into 4 tiles (2 tile columns and 2 tile rows) and 4 rectangular slices.

Figure 4:
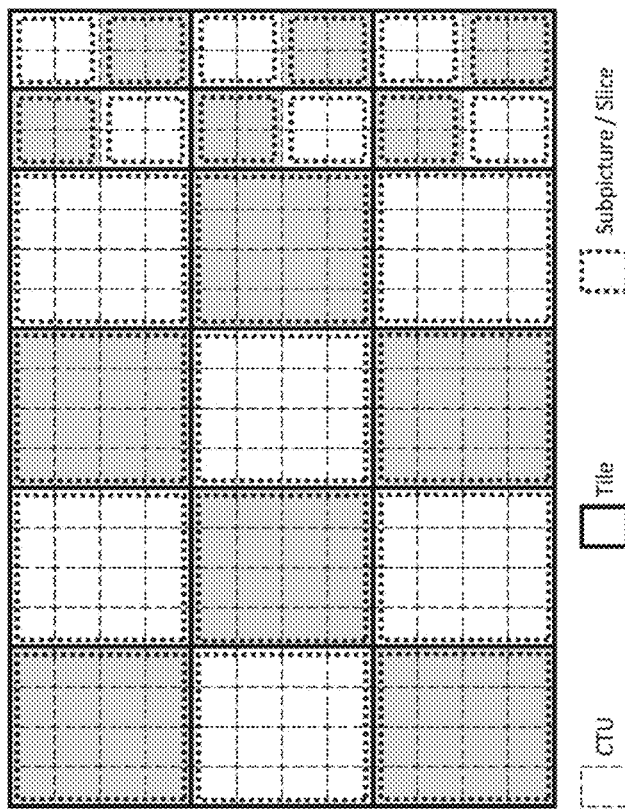
FIG. 4 shows a picture that is partitioned into 15 tiles, 24 slices and 24 subpictures.

FIG. 4 shows an example of subpicture partitioning of a picture, where a picture is partitioned into 18 tiles, 12 on the left-hand side each covering one slice of 4 by 4 CTUs and 6 tiles on the right-hand side each covering 2 vertically-stacked slices of 2 by 2 CTUs, altogether resulting in 24 slices and 24 subpictures of varying dimensions (each slice is a subpicture).

3.3. Picture Resolution Change within a Sequence

In AVC and HEVC, the spatial resolution of pictures cannot change unless a new sequence using a new SPS starts, with an IRAP picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be larger than or equal to ½ (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from ½ to 1/1.75, from 1/1.75 to 1/1.25, and from 1/1.25 to 8. Each set of resampling filters has 16 phases for luma and 32 phases for chroma which is same to the case of motion compensation interpolation filters. Actually the normal motion compensation (MC) interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signaled in the PPS instead of in the SPS, while in the SPS the maximum picture resolution is signaled. ii) For a single-layer bitstream, each picture store (a slot in the DPB for storage of one decoded picture) occupies the buffer size as required for storing a decoded picture having the maximum picture resolution.

3.4. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or three dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the high level syntax (HLS) aspects have been significantly simplified at the sacrifice of some flexibilities. For example, an IRAP AU is required to contain a picture for each of the layers present in the CVS.

3.5. Random Access and its Supports in HEVC and VVC

Random access refers to starting access and decoding of a bitstream from a picture that is not the first picture of the bitstream in decoding order. To support tuning in and channel switching in broadcast/multicast and multiparty video conferencing, seeking in local playback and streaming, as well as stream adaptation in streaming, the bitstream needs to include frequent random access points, which are typically intra coded pictures but may also be inter-coded pictures (e.g., in the case of gradual decoding refresh).

HEVC includes signaling of intra random access points (IRAP) pictures in the NAL unit header, through NAL unit types. Three types of IRAP pictures are supported, namely instantaneous decoder refresh (IDR), clean random access (CRA), and broken link access (BLA) pictures. IDR pictures are constraining the inter-picture prediction structure to not reference any picture before the current group-of-pictures (GOP), conventionally referred to as closed-GOP random access points. CRA pictures are less restrictive by allowing certain pictures to reference pictures before the current GOP, all of which are discarded in case of a random access. CRA pictures are conventionally referred to as open-GOP random access points. BLA pictures usually originate from splicing of two bitstreams or part thereof at a CRA picture, e.g., during stream switching. To enable better systems usage of IRAP pictures, altogether six different NAL units are defined to signal the properties of the IRAP pictures, which can be used to better match the stream access point types as defined in the ISO base media file format (ISOBMFF), which are utilized for random access support in dynamic adaptive streaming over HTTP (DASH).

VVC supports three types of IRAP pictures, two types of IDR pictures (one type with or the other type without associated RADL pictures) and one type of CRA picture. These are basically the same as in HEVC. The BLA picture types in HEVC are not included in VVC, mainly due to two reasons: i) The basic functionality of BLA pictures can be realized by CRA pictures plus the end of sequence NAL unit, the presence of which indicates that the subsequent picture starts a new CVS in a single-layer bitstream. ii) There was a desire in specifying less NAL unit types than HEVC during the development of VVC, as indicated by the use of five instead of six bits for the NAL unit type field in the NAL unit header.

Another key difference in random access support between VVC and HEVC is the support of GDR in a more normative manner in VVC. In GDR, the decoding of a bitstream can start from an inter-coded picture and although at the beginning not the entire picture region can be correctly decoded but after a number of pictures the entire picture region would be correct. AVC and HEVC also support GDR, using the recovery point SEI message for signaling of GDR random access points and the recovery points. In VVC, a new NAL unit type is specified for indication of GDR pictures and the recovery point is signaled in the picture header syntax structure. A CVS and a bitstream are allowed to start with a GDR picture. This means that it is allowed for an entire bitstream to contain only inter-coded pictures without a single intra-coded picture. The main benefit of specifying GDR support this way is to provide a conforming behavior for GDR. GDR enables encoders to smooth the bit rate of a bitstream by distributing intra-coded slices or blocks in multiple pictures as opposed intra coding entire pictures, thus allowing significant end-to-end delay reduction, which is considered more important nowadays than before as ultralow delay applications like wireless display, online gaming, drone based applications become more popular.

Another GDR related feature in VVC is the virtual boundary signaling. The boundary between the refreshed region (i.e., the correctly decoded region) and the unrefreshed region at a picture between a GDR picture and its recovery point can be signaled as a virtual boundary, and when signaled, in-loop filtering across the boundary would not be applied, thus a decoding mismatch for some samples at or near the boundary would not occur. This can be useful when the application determines to display the correctly decoded regions during the GDR process.

IRAP pictures and GDR pictures can be collectively referred to as random access point (RAP) pictures.

3.6. Reference Picture Management and Reference Picture Lists (RPLs)

Reference picture management is a core functionality that is necessary for any video coding scheme that uses inter prediction. It manages the storage and removal of reference pictures into and from a decoded picture buffer (DPB) and puts reference pictures in their proper order in the RPLs.

The reference picture management of HEVC, including reference picture marking and removal from the decoded picture buffer (DPB) as well as reference picture list construction (RPLC), differs from that of AVC. Instead of the reference picture marking mechanism based on a sliding window plus adaptive memory management control operation (MMCO) in AVC, HEVC specifies a reference picture management and marking mechanism based on so-called reference picture set (RPS), and the RPLC is consequently based on the RPS mechanism. An RPS consists of a set of reference pictures associated with a picture, consisting of all reference pictures that are prior to the associated picture in decoding order, that may be used for inter prediction of the associated picture or any picture following the associated picture in decoding order. The reference picture set consists of five lists of reference pictures. The first three lists contain all reference pictures that may be used in inter prediction of the current picture and that may be used in inter prediction of one or more of the pictures following the current picture in decoding order. The other two lists consist of all reference pictures that are not used in inter prediction of the current picture but may be used in inter prediction of one or more of the pictures following the current picture in decoding order. RPS provides an "intra-coded" signaling of the DPB status, instead of an "inter-coded" signaling as in AVC, mainly for improved error resilience. The RPLC process in HEVC is based on the RPS, by signaling an index to an RPS subset for each reference index; this process is simpler than the RPLC process in AVC.

Reference picture management in VVC is more similar to HEVC than AVC, but is somewhat simpler and more robust. As in those standards, two RPLs, list 0 and list 1, are derived, but they are not based on the reference picture set concept used in HEVC or the automatic sliding window process used in AVC; instead they are signaled more directly. Reference pictures are listed for the RPLs as either active and inactive entries, and only the active entries may be used as reference indices in inter prediction of CTUs of the current picture. Inactive entries indicate other pictures to be held in the DPB for referencing by other pictures that arrive later in the bitstream.

3.7. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.8. Related Definitions in in VVC

Related definitions in the latest VVC text (in JVET-Q2001-vE/v15) are as follows.

associated IRAP picture (of a particular picture): The previous IRAP picture in decoding order (when present) having the same value of nuh_layer_id as the particular picture.

clean random access (CRA) PU: A PU in which the coded picture is a CRA picture.

clean random access (CRA) picture: An IRAP picture for which each VCL NAL unit has nal_unit_type equal to CRA_NUT.

coded video sequence (CVS): A sequence of AUs that consists, in decoding order, of a CVSS AU, followed by zero or more AUs that are not CVSS AUs, including all subsequent AUs up to but not including any subsequent AU that is a CVSS AU.

coded video sequence start (CVSS) AU: An AU in which there is a PU for each layer in the CVS and the coded picture in each PU is a CLVSS picture.

gradual decoding refresh (GDR) AU: An AU in which the coded picture in each present PU is a GDR picture.

gradual decoding refresh (GDR) PU: A PU in which the coded picture is a GDR picture.

gradual decoding refresh (GDR) picture: A picture for which each VCL NAL unit has nal_unit_type equal to GDR_NUT.

instantaneous decoding refresh (IDR) PU: A PU in which the coded picture is an IDR picture.

instantaneous decoding refresh (IDR) picture: An IRAP picture for which each VCL NAL unit has nal_unit_type equal to IDR_W_RADL or IDR_N_LP.

intra random access point (IRAP) AU: An AU in which there is a PU for each layer in the CVS and the coded picture in each PU is an IRAP picture.

intra random access point (IRAP) PU: A PU in which the coded picture is an IRAP picture.

intra random access point (IRAP) picture: A coded picture for which all VCL NAL units have the same value of nal_unit_type in the range of IDR_W_RADL to CRA_NUT, inclusive.

leading picture: A picture that is in the same layer as the associated IRAP picture and precedes the associated IRAP picture in output order.

output order: The order in which the decoded pictures are output from the DPB (for the decoded pictures that are to be output from the DPB).

random access decodable leading (RADL) PU: A PU in which the coded picture is a RADL picture.

random access decodable leading (RADL) picture: A picture for which each VCL NAL unit has nal_unit_type equal to RADL_NUT.

random access skipped leading (RASL) PU: A PU in which the coded picture is a RASL picture.

random access skipped leading (RASL) picture: A picture for which each VCL NAL unit has nal_unit_type equal to RASL_NUT.

step-wise temporal sublayer access (STSA) PU: A PU in which the coded picture is an STSA picture.

step-wise temporal sublayer access (STSA) picture: A picture for which each VCL NAL unit has nal_unit_type equal to STSA_NUT.

NOTE—An STSA picture does not use pictures with the same TemporalId as the STSA picture for inter prediction reference. Pictures following an STSA picture in decoding order with the same TemporalId as the STSA picture do not use pictures prior to the STSA picture in decoding order with the same TemporalId as the STSA picture for inter prediction reference. An STSA picture enables up-switching, at the STSA picture, to the sublayer containing the STSA picture, from the immediately lower sublayer. STSA pictures must have TemporalId greater than 0.

subpicture: An rectangular region of one or more slices within a picture.

trailing picture: A non-IRAP picture that follows the associated IRAP picture in output order and is not an STSA picture.

NOTE—Trailing pictures associated with an IRAP picture also follow the IRAP picture in decoding order. Pictures that follow the associated IRAP picture in output order and precede the associated IRAP picture in decoding order are not allowed.

3.9. NAL Unit Header Syntax and Semantics in VVC

In the latest VVC text (in JVET-Q2001-vE/v15), the NAL unit header syntax and semantics are as follows.

7.3.1.2 NAL Unit Header Syntax

|  | Descriptor |
| --- | --- |
| nal_unit_header( ) { |  |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } |  |

7.4.2.2 NAL Unit Header Semantics forbidden_zero_bit shall be equal to 0.

nuh_reserved_zero_bit shall be equal to 0. The value 1 of nuh_reserved_zero_bit may be specified in the future by ITU-T | ISO/IEC. Decoders shall ignore (i.e. remove from the bitstream and discard) NAL units with nuh_reserved_zero_bit equal to 1.

nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T | ISO/IEC.

The value of nuh_layer_id shall be the same for all VCL NAL units of a coded picture. The value of nuh_layer_id of a coded picture or a PU is the value of the nuh_layer_id of the VCL NAL units of the coded picture or the PU.

The value of nuh_layer_id for AUD, PH, EOS, and FD NAL units is constrained as follows:

If nal_unit_type is equal to AUD_NUT, nuh_layer_id shall be equal to vps_layer_id[0].

Otherwise, when nal_unit_type is equal to PH_NUT, EOS_NUT, or FD_NUT, nuh_layer_id shall be equal to the nuh_layer_id of associated VCL NAL unit.

NOTE 1—The value of nuh_layer_id of DCI, VPS, and EOB NAL units is not constrained.

The value of nal_unit_type shall be the same for all pictures of a CVSS AU.

nal_unit_type specifies the NAL unit type, i.e., the type of RBSP data structure contained in the NAL unit as specified in Table 5.

NA units that have nal_unit_type in the range of UNSPEC_28.UNSPEC_31, inclusive, for which semantics are not specified, shall not affect the decoding process specified in this Specification.

NOTE 2—NAL unit types in the range of UNSPEC_2.UNSPEC31 may be used determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the DUs of the bitstream (as specified in Annex C), decoders shall ignore (remove from the bitstream and discard) the contents of all NAL units that use reserved values of nal_unit_type.

NOTE 3—This requirement allows future definition of compatible extensions to this Specification.

TABLE 5

NAL unit type codes and NAL unit type classes

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture slice_layer_rbsp( ) | VCL |
| 8 | IDR_N_LP | | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |

TABLE 5-continued

NAL unit type codes and NAL unit type classes

| nal_unit_type | Name of nal_unit_type | Content of NAL unit and RBSP syntax structure | NAL unit type class |
|---|---|---|---|
| 11 | RSV_IRAP_11 | Reserved IRAP VCL NAL typesunit | VCL |
| 12 | RSV_IRAP_12 | | |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

NOTE 4—A clean random access (CRA) picture may have associated RASL or RADL pictures present in the bitstream.

NOTE 5—An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

The value of nal_unit_type shall be the same for all VCL NAL units of a subpicture. A subpicture is referred to as having the same NAL unit type as the VCL NAL units of the subpicture.

For VCL NAL units of any particular picture, the following applies:

If mixed_nalu_types_in_pic_flag is equal to 0, the value of nal_unit_type shall be the same for all VCL NAL units of a picture, and a picture or a PU is referred to as having the same NAL unit type as the coded slice NAL units of the picture or PU.

Otherwise (mixed_nalu_types_in_pic_flag is equal to 1), the picture shall have at least two subpictures and VCL NAL units of the picture shall have exactly two different nal_unit_type values as follows: the VCL NAL units of at least one subpicture of the picture shall all have a particular value of nal_unit_type equal to STSA_NUT, RADL_NUT, RASL_NUT, IDR_W_RADL, IDR_N_LP, or CRA_NUT, while the VCL NAL units of other subpictures in the picture shall all have a different particular value of nal_unit_type equal to TRAIL_NUT, RADL_NUT, or RASL_NUT.

For a single-layer bitstream, the following constraints apply:
  Each picture, other than the first picture in the bitstream in decoding order, is considered to be associated with the previous IRAP picture in decoding order.
  When a picture is a leading picture of an IRAP picture, it shall be a RADL or RASL picture.
  When a picture is a trailing picture of an IRAP picture, it shall not be a RADL or RASL picture.
  No RASL pictures shall be present in the bitstream that are associated with an IDR picture.
  No RADL pictures shall be present in the bitstream that are associated with an IDR picture having nal_unit_type equal to IDR_N_LP.
  NOTE 6—It is possible to perform random access at the position of an IRAP PU by discarding all PUs before the IRAP PU (and to correctly decode the IRAP picture and all the subsequent non-RASL pictures in decoding order), provided each parameter set is available (either in the bitstream or by external means not specified in this Specification) when it is referenced.
  Any picture that precedes an IRAP picture in decoding order shall precede the IRAP picture in output order and shall precede any RADL picture associated with the IRAP picture in output order.
  Any RASL picture associated with a CRA picture shall precede any RADL picture associated with the CRA picture in output order.
  Any RASL picture associated with a CRA picture shall follow, in output order, any IRAP picture that precedes the CRA picture in decoding order.
  If field_seq_flag is equal to 0 and the current picture is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture preceding picA in decoding order, and there shall be no non-leading picture between picA and picB in decoding order.
nuh_temporal_id_plus1 minus 1 specifies a temporal identifier for the NAL unit.
The value of nuh_temporal_id_plus1 shall not be equal to 0.

The variable TemporalId is derived as follows:

$$TemporalId = nuh\_temporal\_id\_plus1 - 1 \qquad (36)$$

When nal_unit_type is in the range of IDR_W_RADL to RSV_IRAP_12, inclusive, TemporalId shall be equal to 0.
When nal_unit_type is equal to STSA_NUT and vps_independent_layer_flag[GeneralLayerIdx[nuh_layer_id]] is equal to 1, TemporalId shall not be equal to 0.
The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.
The value of TemporalId for non-VCL NAL units is constrained as follows:
  If nal_unit_type is equal to DCI_NUT, VPS_NUT, or SPS_NUT, TemporalId shall be equal to 0 and the TemporalId of the AU containing the NAL unit shall be equal to 0.
  Otherwise, if nal_unit_type is equal to PH_NUT, TemporalId shall be equal to the TemporalId of the PU containing the NAL unit.
  Otherwise, if nal_unit_type is equal to EOS_NUT or EOB_NUT, TemporalId shall be equal to 0.
  Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.
  Otherwise, when nal_unit_type is equal to PPS_NUT, PREFIX_APS_NUT, or SUFFIX_APS_NUT, TemporalId shall be greater than or equal to the TemporalId of the PU containing the NAL unit.
  NOTE 7—When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX_APS_NUT, or SUFFIX_APS_NUT, TemporalId may be greater than or equal to the TemporalId of the containing AU, as all PPSs and APSs may be included in the beginning of the bitstream (e.g., when they are transported out-of-band, and the receiver places them at the beginning of the bitstream), wherein the first coded picture has TemporalId equal to 0.
3.10. Mixed NAL Unit Types within a Picture
7.4.3.4 Picture Parameter Set Semantics
. . . .
  mixed_nalu_types_in_pic_flag equal to 1 specifies that each picture referring to the PPS has more than one VCL NAL unit, the VCL NAL units do not have the same value of nal_unit_type, and the picture is not an IRAP picture. mixed_nalu_types_in_pic_flag equal to 0 specifies that each picture referring to the PPS has one or more VCL NAL units and the VCL NAL units of each picture referring to the PPS have the same value of nal_unit_type.
  When no_mixed_nalu_types_in_pic_constraint_flag is equal to 1, the value of mixed_nalu_types_in_pic_flag shall be equal to 0.
  For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:
    The slice shall belong to a subpicture subpicA for which the value of the corresponding subpic_treated_as_pic_flag[i] is equal to 1.
    The slice shall not belong to a subpicture of picA containing VCL NAL units with nal_unit_type not equal to nalUnitTypeA.
    If nalUnitTypeA is equal to CRA, for all the following PUs following the current picture in the CLVS in decoding order and in output order, neither RefPicList[0] nor RefPicList[1] of a slice in subpicA in those PUs shall include any picture preceding picA in decoding order in an active entry.
    Otherwise (i.e., nalUnitTypeA is equal to IDR_W_RADL or IDR_N_LP), for all the PUs in the CLVS following the current picture in decoding order, neither RefPicList[0] nor RefPicList[1] of a slice in subpicA in those PUs shall include any picture preceding picA in decoding order in an active entry.

NOTE 1—mixed_nalu_types_in_pic_flag equal to 1 indicates that pictures referring to the PPS contain slices with different NAL unit types, e.g., coded pictures originating from a subpicture bitstream merging operation for which encoders have to ensure matching bitstream structure and further alignment of parameters of the original bitstreams. One example of such alignments is as follows: When the value of sps_idr_rpl_present_flag is equal to 0 and mixed_nalu_types_in_pic_flag is equal to 1, a picture referring to the PPS cannot have slices with nal_unit_type equal to IDR_W_RADL or IDR_N_LP.

3.11. Picture Header Structure Syntax and Semantics in VVC

In the latest VVC text (in JVET-Q2001-vE/v15), the picture header structure syntax and semantics that are most relevant to the embodiments herein are as follows.

7.3.2.7 Picture Header Structure Syntax

| | Descriptor |
|---|---|
| picture_header_structure( ) { | |
| gdr_or_irap_pic_flag | u(1) |
| if( gdr_or_irap_pic_flag ) | |
| gdr_pic_flag | u(1) |
| ... | |
| ph_pic_order_cnt_lsb | u(v) |
| if( gdr_or_irap_pic_flag) | |
| no_output_of_prior_pics_flag | u(1) |
| if( gdr_pic_flag ) | |
| recovery_poc_cnt | ue(v) |
| ... | ue(v) |
| } | |

7.4.3.7 Picture Header Structure Semantics

The PH syntax structure contains information that is common for all slices of the coded picture associated with the PH syntax structure.

gdr_or_irap_pic_flag equal to 1 specifies that the current picture is a GDR or IRAP picture. gdr_or_irap_pic_flag equal to 0 specifies that the current picture may or may not be a GDR or IRAP picture.

gdr_pic_flag equal to 1 specifies the picture associated with the PH is a GDR picture. gdr_pic_flag equal to 0 specifies that the picture associated with the PH is not a GDR picture. When not present, the value of gdr_pic_flag is inferred to be equal to 0. When gdr_enabled_flag is equal to 0, the value of gdr_pic_flag shall be equal to 0.

NOTE 1—When gdr_or_irap_pic_flag is equal to 1 and gdr_pic_flag is equal to 0, the picture associated with the PH is an IRAP picture.

phpic_order_cnt_lsb specifies the picture order count modulo MaxPicOrderCntLsb for the current picture. The length of the ph_pic_order_cnt_lsb syntax element is log 2_max_pic_order_cnt_lsb_minus4+4 bits. The value of the ph_pic_order_cnt_lsb shall be in the range of 0 to MaxPicOrderCntLsb−1, inclusive.

no_output_of_prior_pics flag affects the output of previously-decoded pictures in the DPB after the decoding of a CLVSS picture that is not the first picture in the bitstream as specified in Annex C.

recovery_poc_cnt specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb−1, inclusive.

When the current picture is a GDR picture, the variable RpPicOrderCntVal is derived as follows:

$$RpPicOrderCntVal = PicOrderCntVal + recovery\_poc\_cnt \qquad (81)$$

NOTE 2—When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

3.12. Constraints on RPLs in VVC

In the latest VVC text (in JVET-Q2001-vE/v15), the constraints on RPLs in VVC are as follows (as part of VVC's clause 8.3.2 Decoding process for reference picture lists construction).

8.3.2 Decoding Process for Reference Picture Lists Construction

. . .

For each i equal to 0 or 1, the first NumRefIdxActive[i] entries in RefPicList[i] are referred to as the active entries in RefPicList[i], and the other entries in RefPicList[i] are referred to as the inactive entries in RefPicList[i].

NOTE 2—It is possible that a particular picture is referred to by both an entry in RefPicList[0] and an entry in RefPicList[1]. It is also possible that a particular picture is referred to by more than one entry in RefPicList[0] or by more than one entry in RefPicList[1].

NOTE 3—The active entries in RefPicList[0] and the active entries in RefPicList[1] collectively refer to all reference pictures that may be used for inter prediction of the current picture and one or more pictures that follow the current picture in decoding order. The inactive entries in RefPicList[0] and the inactive entries in RefPicList[1] collectively refer to all reference pictures that are not used for inter prediction of the current picture but may be used in inter prediction for one or more pictures that follow the current picture in decoding order.

NOTE 4—There may be one or more entries in RefPicList[0] or RefPicList[1] that are equal to "no reference picture" because the corresponding pictures are not present in the DPB. Each inactive entry in RefPicList[0] or RefPicList[0] that is equal to "no reference picture" should be ignored. An unintentional picture loss should be inferred for each active entry in RefPicList[0] or RefPicList[1] that is equal to "no reference picture".

It is a requirement of bitstream conformance that the following constraints apply:

For each i equal to 0 or 1, num_ref_entries[i][RplsIdx[i]] shall not be less than NumRefIdxActive[i].

The picture referred to by each active entry in RefPicList[0] or RefPicList[1] shall be present in the DPB and shall have TemporalId less than or equal to that of the current picture.

The picture referred to by each entry in RefPicList[0] or RefPicList[1] shall not be the current picture and shall have non_reference_picture_flag equal to 0.

An STRP entry in RefPicList[0] or RefPicList[1] of a slice of a picture and an LTRP entry in RefPicList[0] or RefPicList[1] of the same slice or a different slice of the same picture shall not refer to the same picture.

There shall be no LTRP entry in RefPicList[0] or RefPicList[1] for which the difference between the PicOrderCntVal of the current picture and the PicOrderCntVal of the picture referred to by the entry is greater than or equal to $2^{24}$.

Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics shall be less than or equal to MaxDpbSize−1, inclusive, where MaxDpbSize is as specified in clause A.4.2, and setOfRefPics shall be the same for all slices of a picture.

When the current slice has nal_unit_type equal to STSA_NUT, there shall be no active entry in RefPicList[0] or RefPicList[1] that has TemporalId equal to that of the current picture and nuh_layer_id equal to that of the current picture.

When the current picture is a picture that follows, in decoding order, an STSA picture that has TemporalId equal to that of the current picture and nuh_layer_id equal to that of the current picture, there shall be no picture that precedes the STSA picture in decoding order, has TemporalId equal to that of the current picture, and has nuh_layer_id equal to that of the current picture included as an active entry in RefPicList[0] or RefPicList[1].

When the current picture is a CRA picture, there shall be no picture referred to by an entry in RefPicList[0] or RefPicList[1] that precedes, in output order or decoding order, any preceding IRAP picture in decoding order (when present).

When the current picture is a trailing picture, there shall be no picture referred to by an active entry in RefPicList[0] or RefPicList[1] that was generated by the decoding process for generating unavailable reference pictures for the IRAP picture associated with the current picture.

When the current picture is a trailing picture that follows, in both decoding order and output order, one or more leading pictures associated with the same IRAP picture, if any, there shall be no picture referred to by an entry in RefPicList[0] or RefPicList[1] that was generated by the decoding process for generating unavailable reference pictures for the IRAP picture associated with the current picture.

When the current picture is a recovery point picture or a picture that follows the recovery point picture in output order, there shall be no entry in RefPicList[0] or RefPicList[1] that contains a picture that was generated by the decoding process for generating unavailable reference pictures for the GDR picture of the recovery point picture.

When the current picture is a trailing picture, there shall be no picture referred to by an active entry in RefPicList[0] or RefPicList[1] that precedes the associated IRAP picture in output order or decoding order.

When the current picture is a trailing picture that follows, in both decoding order and output order, one or more leading pictures associated with the same IRAP picture, if any, there shall be no picture referred to by an entry in RefPicList[0] or RefPicList[1] that precedes the associated IRAP picture in output order or decoding order.

When the current picture is a RADL picture, there shall be no active entry in RefPicList[0] or RefPicList[1] that is any of the following:
A RASL picture
A picture that was generated by the decoding process for generating unavailable reference pictures
A picture that precedes the associated IRAP picture in decoding order The picture referred to by each ILRP entry in RefPicList[0] or RefPicList[1] of a slice of the current picture shall be in the same AU as the current picture.

The picture referred to by each ILRP entry in RefPicList[0] or RefPicList[1] of a slice of the current picture shall be present in the DPB and shall have nuh_layer_id less than that of the current picture.

Each ILRP entry in RefPicList[0] or RefPicList[1] of a slice shall be an active entry.

3.13. Setting of PictureOutputFlag

In the latest VVC text (in JVET-Q2001-vE/v15), the specification for setting of the value of the variable PictureOutputFlag is as follows (as part of clause 8.1.2 Decoding process for a coded picture).

8.1.2 Decoding Process for a Coded Picture

The decoding processes specified in this clause apply to each coded picture, referred to as the current picture and denoted by the variable CurrPic, in BitstreamToDecode.

Depending on the value of chroma_format_idc, the number of sample arrays of the current picture is as follows:
If chroma_format_idc is equal to 0, the current picture consists of 1 sample array $S_L$.
Otherwise (chroma_format_idc is not equal to 0), the current picture consists of 3 sample arrays $S_L$, $S_{Cb}$, $S_{Cr}$.

The decoding process for the current picture takes as inputs the syntax elements and upper-case variables from clause 7. When interpreting the semantics of each syntax element in each NAL unit, and in the remaining parts of clause 8, the term "the bitstream" (or part thereof, e.g., a CVS of the bitstream) refers to BitstreamToDecode (or part thereof).

Depending on the value of separate_colour_plane_flag, the decoding process is structured as follows:
If separate_colour_plane_flag is equal to 0, the decoding process is invoked a single time with the current picture being the output.
Otherwise (separate_colour_plane_flag is equal to 1), the decoding process is invoked three times. Inputs to the decoding process are all NAL units of the coded picture with identical value of colour_plane_id. The decoding process of NAL units with a particular value of colour_plane_id is specified as if only a CVS with monochrome colour format with that particular value of colour_plane_id would be present in the bitstream. The output of each of the three decoding processes is assigned to one of the 3 sample arrays of the current picture, with the NAL units with colour_plane_id equal to 0, 1 and 2 being assigned to $S_L$, $S_{Cb}$ and $S_{Cr}$, respectively.

NOTE—The variable ChromaArrayType is derived as equal to 0 when separate_colour_plane_flag is equal to 1 and chroma_format_idc is equal to 3. In the decoding process, the value of this variable is evaluated resulting in operations identical to that of monochrome pictures (when chroma_format_idc is equal to 0).

The decoding process operates as follows for the current picture CurrPic:
1. The decoding of NAL units is specified in clause 8.2.
2. The processes in clause 8.3 specify the following decoding processes using syntax elements in the slice header layer and above:

Variables and functions relating to picture order count are derived as specified in clause 8.3.1. This needs to be invoked only for the first slice of a picture.

At the beginning of the decoding process for each slice of a non-IDR picture, the decoding process for reference picture lists construction specified in clause 8.3.2 is invoked for derivation of reference picture list 0 (RefPicList[0]) and reference picture list 1 (RefPicList[1]).

The decoding process for reference picture marking in clause 8.3.3 is invoked, wherein reference pictures may be marked as "unused for reference" or "used for long-term reference". This needs to be invoked only for the first slice of a picture.

When the current picture is a CRA picture with NoOutputBeforeRecoveryFlag equal to 1 or GDR picture with NoOutputBeforeRecoveryFlag equal to 1, the decoding process for generating unavailable reference pictures specified in subclause 8.3.4 is invoked, which needs to be invoked only for the first slice of a picture.

PictureOutputFlag is set as follows:
If one of the following conditions is true, PictureOutputFlag is set equal to 0:
the current picture is a RASL picture and NoOutputBeforeRecoveryFlag of the associated IRAP picture is equal to 1.
gdr_enabled_flag is equal to 1 and the current picture is a GDR picture with NoOutputBeforeRecoveryFlag equal to 1.
gdr_enabled_flag is equal to 1, the current picture is associated with a GDR picture with NoOutputBeforeRecoveryFlag equal to 1, and PicOrderCntVal of the current picture is less than RpPicOrderCntVal of the associated GDR picture.
sps_video_parameter_set_id is greater than 0, ols_mode_idc is equal to 0 and the current AU contains a picture picA that satisfies all of the following conditions:
PicA has PictureOutputFlag equal to 1.
PicA has nuh_layer_id nuhLid greater than that of the current picture.
PicA belongs to the output layer of the OLS (i.e., OutputLayerIdInOls[TargetOlsIdx][0] is equal to nuhLid).
sps_video_parameter_set_id is greater than 0, ols_mode_idc is equal to 2, and ols_output_layer_flag[TargetOlsIdx][GeneralLayerIdx[nuh_layer_id]] is equal to 0.
Otherwise, PictureOutputFlag is set equal to pic_output_flag.
3. The processes in clauses 8.4, 8.5, 8.6, 8.7, and 8.8 specify decoding processes using syntax elements in all syntax structure layers. It is a requirement of bitstream conformance that the coded slices of the picture shall contain slice data for every CTU of the picture, such that the division of the picture into slices, and the division of the slices into CTUs each forms a partitioning of the picture.
4. After all slices of the current picture have been decoded, the current decoded picture is marked as "used for short-term reference", and each ILRP entry in RefPicList[0] or RefPicList[1] is marked as "used for short-term reference".

4. TECHNICAL PROBLEMS SOLVED BY DISCLOSED TECHNICAL SOLUTIONS

The existing design in the latest VVC text (in JVET-Q2001-vE/v15) has the following problems:

1) Since it is allowed to mix different types of subpictures within one picture, calling the content of a NAL unit with a VCL NAL unit type as coded slice of a particular type of picture is confusing. For example, a NAL unit with nal_unit_type equal to CRA_NUT is a coded slice of a CRA picture only when all slices of the picture have nal_unit_type equal to CRA_NUT; when one slice of this picture has nal_unit_type not equal to CRA_NUT, then the picture is not a CRA picture.

2) Currently, the value of subpic_treated_as_pic_flag[ ] is required to be equal to 1 for a subpicture if the subpicture contains a VCL NAL unit with nal_unit_type in the range of IDR_W_RADL to CRA_NUT, inclusive, and mixed_nalu_types_in_pic_flag is equal to 1 for the picture. In other words, the value of subpic_treated_as_pic_flag[ ] is required to be equal to 1 for an IRAP subpicture mixed with another type of subpicture in a picture. However, with the support of more mixes of VCL NAL unit types, this requirement is not enough.

3) Currently only up to two different types of VCL NAL units (and two different types of subpictures) are allowed within a picture.

4) There lacks a constraint on the output order of a trailing subpicture relative to the associated IRAP or GDR subpicture, in both single-layer and multi-layer contexts.

5) Currently, it is specified that when a picture is a leading picture of an IRAP picture, it shall be a RADL or RASL picture. This constraint, together with the definitions of leading/RADL/RASL pictures, disallows mixing of RADL and RASL NAL unit types within a picture resulted from mixing of two CRA pictures and their non-AU-aligned associated RADL and RASL pictures.

6) There lacks a constraint on the subpicture type (i.e., the NAL unit type of the VCL NAL units in a subpicture) for a leading subpicture, in both single-layer and multi-layer contexts.

7) There lacks a constraint on whether a RASL subpicture can be present and associated with an IDR subpicture, in both single-layer and multi-layer contexts.

8) There lacks a constraint on whether a RADL subpictures can be present and associated with an IDR subpicture having nal_unit_type equal to IDR_N_LP, in both single-layer and multi-layer contexts.
9) There lacks a constraint on the relative output order between a subpicture preceding an IRAP subpicture in decoding order and the RADL subpictures associated with the IRAP subpicture, in both single-layer and multi-layer contexts.
10) There lacks a constraint on the relative output order between a subpicture preceding a GDR subpicture in decoding order and the subpictures associated with the GDR subpicture, in both single-layer and multi-layer contexts.
11) There lacks a constraint on the relative output order between a RASL subpicture associated with a CRA subpicture and a RADL subpicture associated with the CRA subpicture, in both single-layer and multi-layer contexts.
12) There lacks a constraint on the relative output order between a RASL subpicture associated with a CRA subpicture and an IRAP subpicture that precedes the CRA subpicture in decoding order, in both single-layer and multi-layer contexts.
13) There lacks a constraint on the relative decoding order between an IRAP picture's associated non-leading pictures and leading pictures, in both single-layer and multi-layer contexts.
14) There lacks a constraint on the RPL active entries for a subpicture following an STSA subpicture in decoding order, in both single-layer and multi-layer contexts.
15) There lacks a constraint on the RPL entries for a CRA subpicture in both single-layer and multi-layer contexts.
16) There lacks a constraint on the RPL active entries for a subpicture that refer to a picture that was generated by the decoding process for generating unavailable reference pictures, in both single-layer and multi-layer contexts.
17) There lacks a constraint on the RPL entries for a subpicture that refer to a picture that was generated by the decoding process for generating unavailable reference pictures, in both single-layer and multi-layer contexts.
18) There lacks a constraint on the RPL active entries for a subpicture associated with an IRAP picture and following the IRAP picture in output order, in both single-layer and multi-layer contexts.
19) There lacks a constraint on the RPL entries for a subpicture associated with an IRAP picture and following the IRAP picture in output order, in both single-layer and multi-layer contexts.
20) There lacks a constraint on the RPL active entries for a RADL subpicture, in both single-layer and multi-layer contexts.

5. EXAMPLES OF SOLUTIONS AND EMBODIMENTS

To solve the above problems, and others, methods as summarized below are disclosed. The items should be considered as examples to explain the general concepts and should not be interpreted in a narrow way. Furthermore, these items can be applied individually or combined in any manner.

1) To solve problem 1, instead of specifying the content of a NAL unit with a VCL NAL unit type as "coded slice of a particular type of picture", it is specified "coded slice of a particular type of picture or subpicture". For example, the content of a NAL unit with nal_unit_type equal to CRA_NUT is specified as "coded slice of a CRA picture or subpicture".
   a. Furthermore, one or more of the following terms are defined: associated GDR subpicture, associated IRAP subpicture, CRA subpicture, GDR subpicture, IDR subpicture, IRAP subpicture, leading subpicture, RADL subpicture, RASL subpicture, STSA subpicture, trailing subpicture.
2) To solve problem 2, add a constraint to require that any two neighboring subpictures with different NAL unit types shall both have the subpic_treated_as_pic_flag[ ] equal to 1.
   a. In one example, the constraint is specified as follows: For any two neighboring subpictures with subpicture indices i and j in a picture, when subpic_treated_as_pic_flag[i] or subpic_treated_as_pic_flag[j] is equal to 0, the two subpictures shall have the same NAL unit type.
   a. Alternatively, it is required that, when any subpicture with subpicture index i has subpic_treated_as_pic_flag[i] equal to 0, all subpictures in a picture shall have the same NAL unit type (i.e., all VCL NAL units in a picture shall have the same NAL unit type, i.e., the value of mixed_nalu_types_in_pic_flag shall be equal to 0). And this means that mixed_nalu_types_in_pic_flag can only be equal to 1 when all subpictures have their corresponding subpic_treated_as_pic_flag[ ] equal to 1.
3) To solve problem 3, when mixed_nalu_types_in_pic_flag is equal to 1, it may be allowed for a picture to contain more than two different types of VCL NAL units.
4) To solve problem 4, it is specified that a trailing subpicture shall follow the associated IRAP or GDR subpicture in output order.
5) To solve problem 5, to allow mixing of RADL and RASL NAL unit types within a picture resulted from mixing of two CRA pictures and their non-AU-aligned associated RADL and RASL pictures, the existing constraint specifying that a leading picture of an IRAP picture shall be a RADL or RASL picture is changed to be as follows: When a picture is a leading picture of an IRAP picture, the nal_unit_type value for all VCL NAL units in the picture shall be equal to RADL_NUT or RASL_NUT. Furthermore, in the decoding process for a picture with mixed nal_unit_type values of RADL_NUT and RASL_NUT, the PictureOutputFlag of the picture is set equal to pic_output_flag when the layer containing the picture is an output layer.
   This way, through the constraint that all pictures that are output need to be correct for conforming decoders, the RADL subpictures within such pictures can be guaranteed, although the guarantee of the "correctness" of the "mid-valued" RASL subpictures within such pictures when the associated CRA picture has NoOutputBeforeRecoveryFlag equal to 1 is also in place but is actually not needed. The unnecessary part of the guarantee does not matter and does not add complexity for implementing conforming encoders or decoders. In this case, it'd be useful to add a NOTE clarifying that although such RASL subpictures associated with a CRA picture with NoOutputBeforeRecoveryFlag equal to 1 may be output by the decoding process, they are not intended to be used for display and thus should not be used for display.

6) To solve problem 6, it is specified that when a subpicture is a leading subpicture of an IRAP subpicture, it shall be a RADL or RASL subpicture.

7) To solve problem 7, it is specified that no RASL subpictures shall be present in the bitstream that are associated with an IDR subpicture.

8) To solve problem 8, it is specified that no RADL subpictures shall be present in the bitstream that are associated with an IDR subpicture having nal_unit_type equal to IDR_N_LP.

9) To solve problem 9, it is specified that any subpicture, with nuh_layer_id equal to a particular value layerId and subpicture index equal to a particular value subpicIdx, that precedes, in decoding order, an IRAP subpicture with nuh_layer_id equal to layerId and subpicture index equal to subpicIdx shall precede, in output order, the IRAP subpicture and all its associated RADL subpictures.

10) To solve problem 10, it is specified that any subpicture, with nuh_layer_id equal to a particular value layerId and subpicture index equal to a particular value subpicIdx, that precedes, in decoding order, a GDR subpicture with nuh_layer_id equal to layerId and subpicture index equal to subpicIdx shall precede, in output order, the GDR subpicture and all its associated subpictures.

11) To solve problem 11, it is specified that any RASL subpicture associated with a CRA subpicture shall precede any RADL subpicture associated with the CRA subpicture in output order.

12) To solve problem 12, it is specified that any RASL subpicture associated with a CRA subpicture shall follow, in output order, any IRAP subpicture that precedes the CRA subpicture in decoding order.

13) To solve problem 13, it is specified that if field_seq_flag is equal to 0 and the current subpicture, with nuh_layer_id equal to a particular value layerId and subpicture index equal to a particular value subpicIdx, is a leading subpicture associated with an IRAP subpicture, it shall precede, in decoding order, all non-leading subpictures that are associated with the same IRAP subpicture; otherwise, let subpicA and subpicB be the first and the last leading subpictures, in decoding order, associated with an IRAP subpicture, respectively, there shall be at most one non-leading subpicture with nuh_layer_id equal to layerId and subpicture index equal to subpicIdx preceding subpicA in decoding order, and there shall be no non-leading picture with nuh_layer_id equal to layerId and subpicture index equal to subpicIdx between picA and picB in decoding order.

14) To solve problem 14, it is specified that when the current subpicture, with TemporalId equal to a particular value tId, nuh_layer_id equal to a particular value layerId, and subpicture index equal to a particular value subpicIdx, is a subpicture that follows, in decoding order, an STSA subpicture with TemporalId equal to tId, nuh_layer_id equal to layerId, and subpicture index equal to subpicIdx, there shall be no picture with TemporalId equal to tId and nuh_layer_id equal to layerId that precedes the picture containing the STSA subpicture in decoding order included as an active entry in RefPicList[0] or RefPicList[1].

15) To solve problem 15, it is specified that when the current subpicture, with nuh_layer_id equal to a particular value layerId and subpicture index equal to a particular value subpicIdx, is a CRA subpicture, there shall be no picture referred to by an entry in RefPicList[0] or RefPicList[1] that precedes, in output order or decoding order, any picture containing a preceding IRAP subpicture with nuh_layer_id equal to layerId and subpicture index equal to subpicIdx in decoding order (when present).

16) To solve problem 16, it is specified that when the current subpicture, with nuh_layer_id equal to a particular value layerId and subpicture index equal to a particular value subpicIdx, is not a RASL subpicture associated with a CRA subpicture of a CRA picture with NoOutputBeforeRecoveryFlag equal to 1, a GDR subpicture of a GDR picture with NoOutputBeforeRecoveryFlag equal to 1, or a subpicture of a recovery picture of a GDR picture with NoOutputBeforeRecoveryFlag equal to 1 and nuh_layer_id equal to layerId, there shall be no picture referred to by an active entry in RefPicList[0] or RefPicList[1] that was generated by the decoding process for generating unavailable reference pictures.

17) To solve problem 17, it is specified that when the current subpicture, with nuh_layer_id equal to a particular value layerId and subpicture index equal to a particular value subpicIdx, is not a CRA subpicture of a CRA picture with NoOutputBeforeRecoveryFlag equal to 1, a subpicture that precedes, in decoding order, the leading subpictures associated with the same CRA subpicture of a CRA picture with NoOutputBeforeRecoveryFlag equal to 1, a leading subpicture associated with a CRA subpicture of a CRA picture with NoOutputBeforeRecoveryFlag equal to 1, a GDR subpicture of a GDR picture with NoOutputBeforeRecoveryFlag equal to 1, or a subpicture of a recovering picture of a GDR picture with NoOutputBeforeRecoveryFlag equal to 1 and nuh_layer_id equal to layerId, there shall be no picture referred to by an entry in RefPicList[0] or RefPicList[1] that was generated by the decoding process for generating unavailable reference pictures.

18) To solve problem 18, it is specified that when the current subpicture is associated with an IRAP subpicture and follows the IRAP subpicture in output order, there shall be no picture referred to by an active entry in RefPicList[0] or RefPicList[1] that precedes the picture containing the associated IRAP subpicture in output order or decoding order.

19) To solve problem 19, it is specified that when the current subpicture is associated with an IRAP subpicture, follows the IRAP subpicture in output order, and follows, in both decoding order and output order, the leading subpictures associated with the same IRAP subpicture, if any, there shall be no picture referred to by an entry in RefPicList[0] or RefPicList[1] that precedes the picture containing the associated IRAP subpicture in output order or decoding order.

20) To solve problem 20, it is specified that when the current subpicture is a RADL subpicture, there shall be no active entry in RefPicList[0] or RefPicList[1] that is any of the following:

a. A picture containing a RASL subpicture b. A picture that precedes the picture containing the associated IRAP subpicture in decoding order

6. EMBODIMENTS

Below are some example embodiments for some of the aspects summarized above in Section 5, which can be applied to the VVC specification. The changed texts are based on the latest VVC text in JVET-Q2001-vE/v15. Most relevant parts that have been added or modified are highlighted in *boldface italics*, and some of the deleted parts are marked with double brackets (e.g., [[a]] denotes the deletion of the character "a"). There are some other changes that are editorial in nature or not part of this disclosure and thus not highlighted.

6.1. First Embodiment

This embodiment is for items 1, 1a, 2, 2a, 4, and 6 to 20.

3 Definitions

. . .

associated GDR picture (of a particular picture with a particular value of nuh_layer_id layerId): The previous GDR picture in decoding order with nuh_layer_id equal to layerId (when present) between which and the particular picture in decoding order there is no IRAP picture with nuh_layer_id equal to layerID.

*associated GDR subpicture (of a particular subpicture with a particular value of nuh_layer_id layerId and a particular value of subpicture index subpicIdx): The previous GDR subpicture in decoding order with nuh_layer_id equal to layerId and subpicture index equal to subpicIdx (when present) between which and the particular subpicture in decoding order there is no IRAP subpicture with nuh_layer_id equal to layerId and subpicture index equal to subpicIdx.* associated IRAP picture (of a particular picture with a particular value of nuh_layer_id layerId): The previous IRAP picture in decoding order with nuh_layer_id equal to layerId (when present) between which and the particular picture in decoding order there is no GDR picture with nuh_layer_id equal to layerId.

*associated IRAP subpicture (of a particular subpicture with a particular value of nuh_layer_id layerId and a particular value of subpicture index subpicIdx): The previous IRAP subpicture in decoding order with nuh_layer_id equal to layerId and subpicture index equal to subpicIdx (when present) between which and the particular subpicture in decoding order there is no GDR subpicture with nuh_layer_ id equal to layerId and subpicture index equal to subpicIdx.* clean random access (CRA) picture: An IRAP picture for which each VCL NAL unit has nal_unit_type equal to CRA_NUT.

*clean random access (CRA) subpicture: An IRAP subpicture for which each VCL NAL unit has nal_unit_type equal to CRA_NUT.* gradual decoding refresh (GDR) AU: An AU in which there is a PU for each layer in the CVS and the coded picture in each present PU is a GDR picture.

gradual decoding refresh (GDR) picture: A picture for which each VCL NAL unit has nal_unit_type equal to GDR_NUT.

*gradual decoding refresh (GDR) subpicture: A subpicture for which each VCL NAL unit has nal_unit_type equal to GDR_NUT.* instantaneous decoding refresh (IDR) picture: An IRAP picture for which each VCL NAL unit has nal_unit_type equal to IDR_W_RADL or IDR_N_LP.

*instantaneous decoding refresh (IDR) subpicture: An IRAP subpicture for which each VCL VAL unit has nal_unit_type equal to IDR_W_RADL or IDR_N_LP.* intra random access point (IRAP) picture: A picture for which all VCL NAL units have the same value of nal_unit_type in the range of IDR_W_RADL to CRA_NUT, inclusive.

*intra random access point (IRAP) subpicture: A subpicture for which all VCL NAL units have the same value of nal_unit_type in the range of IDR_W_RADL to CRA_NUT inclusive* leading picture: A picture that precedes the associated IRAP picture in output order.

*leading subpicture: A picture that precedes the associated IRAP subpicture in output order* output order: The order *of pictures or subpictures within a CLVS indicated by increasing POC values, and for decoded pictures that are output output from DPB, this is the order* in which the decoded pictures are output from the DPB.

random access decodable leading (RADL) picture: A picture for which each VCL NAL unit has nal_unit_type equal to RADL_NUT.

*random access decodable leading (RADL) subpicture: A subpicture for which each VCL NAL unit has nal_unit_type equal to RADL_NUT.* random access skipped leading (RASL) picture: A picture for which each VCL NAL unit has nal_unit_type equal to RASL_NUT.

*random access skipped leading (RASL) subpicture: A subpicture for which each VCL NAL unit has nal_unit_type equal to RASL_NUT* step-wise temporal sublayer access (STSA) picture: A picture for which each VCL NAL unit has nal_unit_type equal to STSA_NUT.

*step-wise temporal sublayer access (STSA) subpicture: A subpicture for which each VCL NAL unit has nal_unit_type equal to STSA_NUT* trailing picture: A picture or which each VCL NAL unit has nal_unit_type equal to TRAIL_NUT.

NOTE—Trailing pictures associated with an IRAP or GDR picture also follow the IRAP or GDR picture in decoding order. Pictures that follow the associated IRAP or GDR picture in output order and precede the associated IRAP or GDR picture in decoding order are not allowed

*trailing subpicture: A subpicture for which each VCL NAL unit has nal_unit_type equal to TRAIL_NUT*

NOTE - *Trailing subpictures associated with an IRAP or GDR subpicture also follow the IRAP or GDR subpicture in decoding order. Subpictures that follow the associated IRAP or GDR subpicture in output order and precede the associated IRAP or GDR subpicture in decoding order are not allowed.*

. . .

7.4.2.2 NAL Unit Header Semantics

. . .

nal_unit_type specifies the NAL unit type, i.e., the type of RBSP data structure contained in the NAL unit as specified in Table 5.

NAL units that have nal_unit_type in the range of UNSPEC_28.UNSPEC_31, inclusive, for which semantics are not specified, shall not affect the decoding process specified in this Specification.

NOTE 2—NAL unit types in the range of UNSPEC_28.UNSPEC_31 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the DUs of the bitstream (as specified in Annex C), decoders shall ignore (remove from the bitstream and discard) the contents of all NAL units that use reserved values of nal_unit_type.

NOTE 3—This requirement allows future definition of compatible extensions to this Specification.

TABLE 5

NAL unit type codes and NAL unit type classes

| nal_unit_ type | Name of nal_unit_type | Content of NAL unit and RBSP syntax structure | NAL unit type class |
|---|---|---|---|
| 0 | TRAIL_NUT | Coded slice of a trailing picture or subpicture slice_layer_rbsp( ) | VCL |
| 1 | STSA_NUT | Coded slice of an STSA picture or subpicture slice_layer_rbsp( ) | VCL |
| 2 | RADL_NUT | Coded slice of a RADL picture or subpicture slice_layer_rbsp( ) | VCL |
| 3 | RASL_NUT | Coded slice of a RASL picture or subpicture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture or subpicture slice_layer_rbsp( ) | VCL |
| 8 | IDR_N_LP | | |
| 9 | CRA_NUT | Coded slice of a CRA picture or subpicture silce_layer_rbsp( ) | VCL |
| 10 | GDR_NUT | Coded slice of a GDR picture or subpicture slice_layer_rbsp( ) | VCL |
| 11 | RSV_IRAP_11 | Reserved IRAP VCL NAL unit types | VCL |
| 12 | RSV_IRAP_12 | | |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOBNUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

NOTE 4—A clean random access (CRA) picture may have associated RASL or RADL pictures present in the bitstream NOTE 5—An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

The value of nal_unit_type shall be the same for all VCL NAL units of a subpicture. A subpicture is referred to as having the same NAL unit type as the VCL NAL units of the subpicture.

*For any two neighboring subpictures with subpicture indices i and j in a picture, when subpic_treated_as_pic_flag[ i ] or subpic_treated_as_pic_flag [ j ] is equal to 0, the two subpictures shall have the same NAL unit type.*

For VCL NAL units of any particular picture, the following applies:

If mixed_nalu_types_in_pic_flag is equal to 0, the value of nal_unit_type shall be the same for all VCL NAL units of a picture, and a picture or a PU is referred to as having the same NAL unit type as the VCL NAL units of the picture or PU.

Otherwise (mixed_nalu_types_in_pic_flag is equal to 1), the picture shall have at least two subpictures and VCL NAL units of the picture shall have exactly two different nal_unit_type values as follows: the VCL NAL units of at least one subpicture of the picture shall all have a particular value of nal_unit_type equal to STSA_NUT, RADL_NUT, RASL_NUT, IDR_W_RADL, IDR_N_LP, or CRA_NUT, while the VCL NAL units of other subpictures in the picture shall all have a different particular value of nal_unit_type equal to TRAIL_NUT, RADL_NUT, or RASL_NUT.

It is a requirement of bitstream conformance that the following constraints apply:

A trailing picture shall follow the associated IRAP or GDR picture in output order.
– *A trailing subpicture, shall follow the associated IRAP or GDR subpicture in output order.*

When a picture is a leading picture of an IRAP picture, it shall be a RADL or RASL picture.
– *When a subpicture is a leading subpicture of an IRAP subpicture, it shall be a RADL or RASL subpicture.*

No RASL pictures shall be present in the bitstream that are associated with an IDR picture.
– *No RASL subpictures shall be present in the bitstream that are associated with an IDR subpicture.*

No RADL pictures shall be present in the bitstream that are associated with an IDR picture having nal_unit_type equal to IDR_N_LP.

NOTE 6—It is possible to perform random access at the position of an IRAP PU by discarding all PUs before the IRAP PU (and to correctly decode the IRAP picture and all the subsequent non-RASL pictures in decoding order), provided each parameter set is available (either in the bitstream or by external means not specified in this Specification) when it is referenced.

– *No RADL subpictures shall be present in the bitstream that are associated with an IDR subpicture having nal_unit_type equal to IDR_N_LP.*

Any picture, with nuh_layer_id equal to a particular value layerId, that precedes, in decoding order, an IRAP picture with nuh_layer_id equal to layerId shall precede, in output order, the IRAP picture and all its associated RADL pictures.
– *Any subpicture, with nuh_layer_id equal to a particular value layerId and subpicture index equal to a particular value subpicIdx, that precedes, in decoding order, an IRAP subpicture with nuh_layer_id equal to layerId and subpicture index equal to subpicIdx shall precede, shall precede, in output order, the IRAP subpicture and all its associated RADL subpictures.*

Any picture, with nuh_layer_id equal to a particular value layerId, that precedes, in decoding order, a GDR picture with nuh_layer_id equal to layerId shall precede, in output order, the GDR picture and all its associated pictures.
– *Any subpicture, with nuh_layer_id equal to a particular value layerId and subpicture index equal to a particular value subpicIdx, that precedes, in decoding order, a GDR subpicture with nuh_layer_id equal to layerId and subpicture index equal to subpicIdx shall precede, in output order, the GDR subpicture and all its associated subpictures.*

Any RASL picture associated with a CRA picture shall precede any RADL picture associated with the CRA picture in output order.
– *Any RASL subpicture associated with a CRA subpicture shall precede any RADL subpicture associated with the CRA subpicture in output order.*

Any RASL picture associated with a CRA picture shall follow, in output order, any IRAP picture that precedes the CRA picture in decoding order.
– *Any RASL subpicture associated with a CRA subpicture shall follow, in output order, any IRAP subpicture that precedes the CRA subpicture in decoding order.*

If field_seq_flag is equal to 0 and the current picture, with nuh_layer_id equal to a particular value layerId, is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture with nuh_layer_id equal to layerId preceding picA in decoding order, and there shall be no non-leading picture with nuh_layer_id equal to layerId between picA and picB in decoding order.
– *If field_seq_flag is equal to 0 and the current subpicture, with nuh_layer_id equal to a particular value layerId and subpicture index equal to a particular value subpicIdx, is a leading subpicture associated with an IRAP subpicture, it shall precede, in decoding order, all non-leading subpictures that are associated with the same IRAP subpicture Otherwise let subpicA and subpicB be the first and the last leading subpictures, in decoding order associated with an IRAP subpicture respectively, there shall be at most one non-leading subpicture with nuh_layer_id equal to layerId and subpicture index equal to subpicIdx preceding subpicA in decoding order, and there shall be no non-leading picture with nuh_layer_id equal to layerId and subpicture index equal to subpicIdx between picA and picB in decoding order.*

. . .

7.4.3.4 Picture Parameter Set Semantics

. . .

mixed_nalu_types_in_pic_flag equal to 1 specifies that each picture referring to the PPS has more than one VCL NAL unit and the VCL NAL units do not have the same value of nal_unit_type[[, and the picture is not an IRAP picture]]. mixed_nalu_types_in_pic_flag equal to 0 specifies that each picture referring to the PPS has one or more VCL NAL units and the VCL NAL units of each picture referring to the PPS have the same value of nal_unit_type. When no_mixed_nalu_types_in_ pic_constraint_flag is equal to 1, the value of mixed_nalu_types_in_pic_flag shall be equal to 0.

[[For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:

The slice shall belong to a subpicture subpicA for which the value of the corresponding subpic_treated_as_pic_flag[i] is equal to 1.

The slice shall not belong to a subpicture of picA containing VCL NAL units with nal_unit_type not equal to nalUnitTypeA.

If nalUnitTypeA is equal to CRA, for all the following PUs following the current picture in the CLVS in decoding order and in output order, neither RefPicList[0] nor RefPicList[1] of a slice in subpicA in those PUs shall include any picture preceding picA in decoding order in an active entry.

Otherwise (i.e., nalUnitTypeA is equal to IDR_W_RADL or IDR_N_LP), for all the PUs in the CLVS following the current picture in decoding order, neither RefPicList[0] nor RefPicList[1] of a slice in subpicA in those PUs shall include any picture preceding picA in decoding order in an active entry.]]

NOTE 1—mixed_nalu_types_in_pic_flag equal to 1 indicates that pictures referring to the PPS contain slices with different NAL unit types, e.g., coded pictures originating from a subpicture bitstream merging operation for which encoders have to ensure matching bitstream structure and further alignment of parameters of the original bitstreams. One example of such alignments is as follows: When the value of sps_idr_rpl_present_flag is equal to 0 and mixed_nalu_types_in_pic_flag is equal to 1, a picture referring to the PPS cannot have slices with nal_unit_type equal to IDR_W_RADL or IDR_N_LP.

. . .

7.4.3.7 Picture Header Structure Semantics

. . .

recovery_poc_cnt specifies the recovery point of decoded pictures in output order.

*When the current picture is a GDR picture, the variable recoveryPointPocVal is derived as follows: recoveryPointPocVal = PicOrderCntVal + recovery_ poc_cnt(81)*

If the current picture is a GDR picture, [[that is associated with the PH]], and there is a picture picA that follows the current GDR picture in decoding order in the CLVS that has PicOrderCntVal equal to *recoveryPointPocVal* [[the PicOrderCntVal of the current GDR picture plus the value of recovery_poc_cnt]], the picture picA is referred to as the recovery point picture. Otherwise, the first picture in output order that has PicOrderCntVal greater than *recoveryPointPocVal* [[the PicOrderCntVal of the current picture plus the value of recovery_poc_cnt]] *in the CLVS* is referred to as the recovery point picture. The recovery point picture shall not precede the current GDR picture in decoding order. *The pictures that are associated with the current GDR picture and have PicOrderCntVal less than recoveryPointPocVal are referred to as the recovering pictures of the GDR picture.* The value of recovery_poc_cnt shall be in the range of 0 to MaxPicOrderCntLsb−1, inclusive.

[[When the current picture is a GDR picture, the variable RpPicOrderCntVal is derived as follows:

RpPicOrderCntVal=PicOrderCntVal+recovery_poc_cnt  (81)]]

NOTE 2—When gdr_enabled_flag is equal to 1 and PicOrderCntVal of the current picture is greater than or equal to *recoveryPointPocVal* [[RpPicOrderCntVal]] of the associated GDR picture, the current and subsequent decoded pictures in output order are exact match to the corresponding pictures produced by starting the decoding process from the previous IRAP picture, when present, preceding the associated GDR picture in decoding order.

. . .

8.3.2 Decoding Process for Reference Picture Lists Construction

. . .

It is a requirement of bitstream conformance that the following constraints apply:

For each i equal to 0 or 1, num_ref_entries[i][RplsIdx[i] ] shall not be less than NumRefIdxActive[i].

The picture referred to by each active entry in RefPicList[0] or RefPicList[1] shall be present in the DPB and shall have TemporalId less than or equal to that of the current picture.

The picture referred to by each entry in RefPicList[0] or RefPicList[1] shall not be the current picture and shall have non_reference_picture_flag equal to 0.

An STRP entry in RefPicList[0] or RefPicList[1] of a slice of a picture and an LTRP entry in RefPicList[0] or RefPicList[1] of the same slice or a different slice of the same picture shall not refer to the same picture.

There shall be no LTRP entry in RefPicList[0] or RefPicList[1] for which the difference between the PicOrderCntVal of the current picture and the PicOrderCntVal of the picture referred to by the entry is greater than or equal to $2^{24}$.

Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics shall be less than or equal to MaxDpbSize−1, inclusive, where MaxDpbSize is as specified in clause A.4.2, and setOfRefPics shall be the same for all slices of a picture.

When the current slice has nal_unit_type equal to STSA_NUT, there shall be no active entry in RefPicList[0] or RefPicList[1] that has TemporalId equal to that of the current picture and nuh_layer_id equal to that of the current picture.

When the current picture is a picture that follows, in decoding order, an STSA picture that has TemporalId equal to that of the current picture and nuh_layer_id equal to that of the current picture, there shall be no picture that precedes the STSA picture in decoding order, has TemporalId equal to that of the current picture, and has nuh_layer_id equal to that of the current picture included as an active entry in RefPicList[0] or RefPicList[1].
- When the current subpicture
  with TemporalId equal to a particular value tId
  nuh_layer_id equal to a particular value layerId
  and subpicture index equal to a particular
  value subpicIdx, is a subpicture that follows,
  in decoding order, an STSA subpicture with
  TemporalId equal to tId, nuh_layer_id equal to
  layerId, and subpicture index equal
  to subpicIdx, there shall be no picture with
  TemporalId equal to tId and nuh_layer_id equal
  to layerId that precedes the picture containing
  the STSA subpicture in decoding
  order included as an active
  entry in RefPicList[ 0 ] or RefPicList[ 1 ]

When the current picture, with nuh_layer_id equal to a particular value layerId, is a CRA picture, there shall be no picture referred to by an entry in RefPicList[0] or RefPicList[1] that precedes, in output order or decoding order, any preceding IRAP picture with nuh_layer_id equal to layerId in decoding order (when present).
- When the current subpicture
  with nuh_layer_id equal to a
  particular value layerId and subpicture index
  equal to a particular value subpicIdx
  is a CRA subpicture there shall be no picture
  referred to by an entry in RefPicList[ 0 ] or
  RefPicList[ 1 ] that precedes
  in output order or decoding order
  any picture containing a preceding
  IRAP subpicture with
  nuh_layer_id equal to layerId
  and subpicture index equal
  to subpicIdx in decoding order (when present)

When the current picture, with nuh_layer_id equal to a particular value layerId, is not a RASL picture associated with a CRA picture with NoOutputBeforeRecoveryFlag equal to 1, a GDR picture with NoOutputBeforeRecoveryFlag equal to 1, or a recovering picture of a GDR picture with NoOutputBeforeRecoveryFlag equal to 1 and nuh_layer_id equal to layerId, there shall be no picture referred to by an active entry in RefPicList[0] or RefPicList[1] that was generated by the decoding process for generating unavailable reference pictures.
- When the current subpicture
  with nuh_layer_id equal to a
  particular value layerId and subpicture index
  equal to a particular value subpicIdx
  is not a RASL subpicture associated with a
  CRA subpicture of a CRA picture with
  NoOutputBeforeRecoveryFlag equal to 1
  a GDR subpicture of a GDR picture with
  NoOutputBeforeRecovery Flag equal to 1
  or a subpicture of a recoverying picture of
  a GDR picture with
  NoOutputBeforeRecoveryFlag equal to 1 and
  nuh_layer_id equal to layerId,
  there shall be no picture referred to by an active
  entry in RefPicList[ 0 ] or RefPicList[ 1 ]
  that was generated by the decoding
  process for generating
  unavailable reference pictures.

When the current picture, with nuh_layer_id equal to a particular value layerId, is not a CRA picture with NoOutputBeforeRecoveryFlag equal to 1, a picture that precedes, in decoding order, the leading pictures associated with the same CRA picture with NoOutputBeforeRecoveryFlag equal to 1, a leading picture associated with a CRA picture with NoOutputBeforeRecoveryFlag equal to 1, a GDR picture with NoOutputBeforeRecoveryFlag equal to 1, or a recovering picture of a GDR picture with NoOutputBeforeRecoveryFlag equal to 1 and nuh_layer_id equal to layerId, there shall be no picture referred to by an entry in RefPicList[0] or RefPicList[1] that was generated by the decoding process for generating unavailable reference pictures.
- When the current subpicture,
  with nuh_layer_id equal to a particular
  value layerId and subpicture index
  equal to a particular value subpicIdx
  is not a CRA subpicture of a CRA picture with
  NoOutputBeforeRecoveryFlag equal to 1,
  a subpicture that precedes, in decoding order,
  the leading subpictures associated
  with the same CRA subpicture of a CRA
  picture with NoOutputBeforeRecoveryFlag
  equal to 1, a leading subpicture associated
  with a CRA subpicture of a CRA picture with
  NoOutputBeforeRecoveryFlag equal to 1,
  a GDR subpicture of a GDR picture with
  NoOutputBeforeRecoveryFlag equal to 1,
  or a subpicture of a recovering picture of
  a GDR picture with
  NoOutputBeforeRecoveryFlag equal to 1 and
  nuh_layer_id equal to layerId
  there shall be no picture
  referred to by an entry in
  RefPicList[ 0 ] or RefPicList[ 1 ]
  that was generated by the decoding process for
  generating unavailable reference pictures When the current picture is associated with an IRAP picture and follows the IRAP picture in output order, there shall be no picture referred to by an active entry in RefPicList[0] or RefPicList[1] that precedes the associated IRAP picture in output order or decoding order.
- When the current supicture
  is associated with an IRAP
  subpicture and follows the IRAP subpicture in
  output order there shall be no picture
  referred to by an active entry in RefPicList[ 0 ]
  or RefPicList[ 1 ] that precedes the picture
  containing the associated IRAP
  subpicture in output order or decoding order When the current picture is associated with an IRAP picture, follows the IRAP picture in output order, and follows, in both decoding order and output order, the leading pictures associated with the same IRAP picture, if any, there shall be no picture referred to by an entry in RefPicList[0] or RefPicList[1] that precedes the associated IRAP picture in output order or decoding order. - When the current subpicture
  is associated with an IRAP subpicture
  follows the IRAP subpicture in output order,
  and follows, in both decoding order
  and output order, the leading subpictures
  associated with the same IRAP subpicture,
  if any, there shall be no picture

*referred to by an entry in RefPicList[ 0 ] or RefPicList[ 1 ] that precedes the picture containing the associated IRAP subpicture in output order or decoding order.*

When the current picture is a RADL picture, there shall be no active entry in RefPicList[0] or RefPicList[1] that is any of the following:
A RASL picture
A picture that precedes the associated IRAP picture in decoding order — *When the current subpicture is a RADL subpicture, there shall be no active entry in RefPicList[ 0 ] or RefPicList[ 1 ] that is any of the following:*
  o *A picture containing a RASL subpicture*
  o *A picture that precedes the picture containing the associated IRAP subpicture in decoding order*

The picture referred to by each ILRP entry in RefPicList[0] or RefPicList[1] of a slice of the current picture shall be in the same AU as the current picture.

The picture referred to by each ILRP entry in RefPicList[0] or RefPicList[1] of a slice of the current picture shall be present in the DPB and shall have nuh_layer_id less than that of the current picture.

Each ILRP entry in RefPicList[0] or RefPicList[1] of a slice shall be an active entry.

Figure 5:
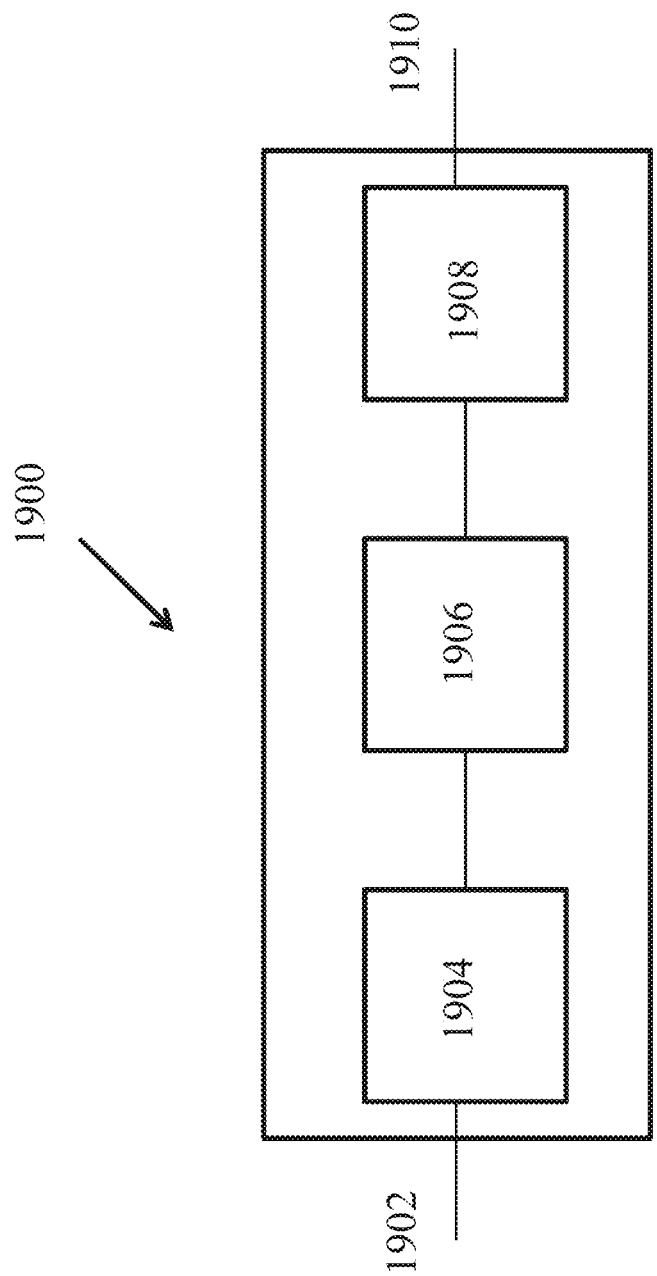
FIG. 5 is a block diagram of an example video processing system.

FIG. 5 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 6:
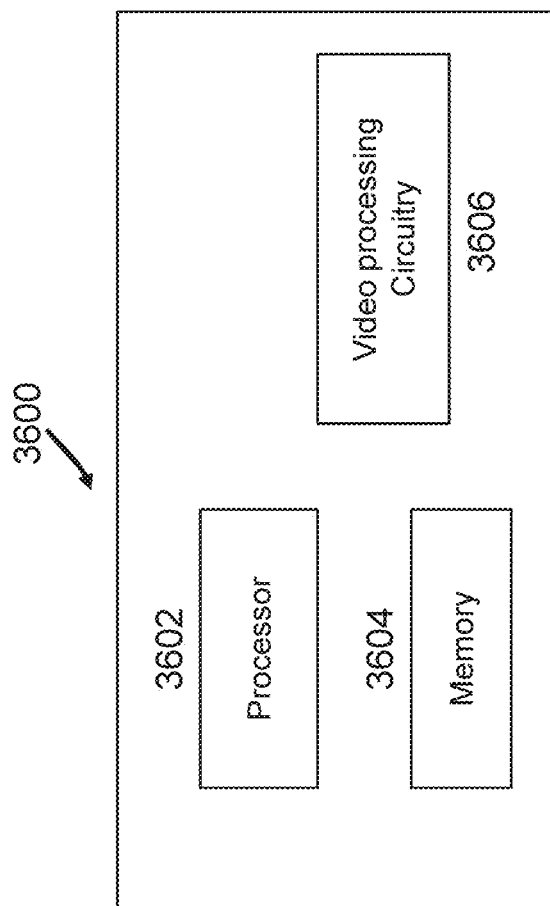
FIG. 6 is a block diagram of a video processing apparatus.

FIG. 6 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and techniques described herein. The video processing hardware 3606 may be used to implement, in hardware circuitry, some techniques described in the present disclosure.

Figure 8:
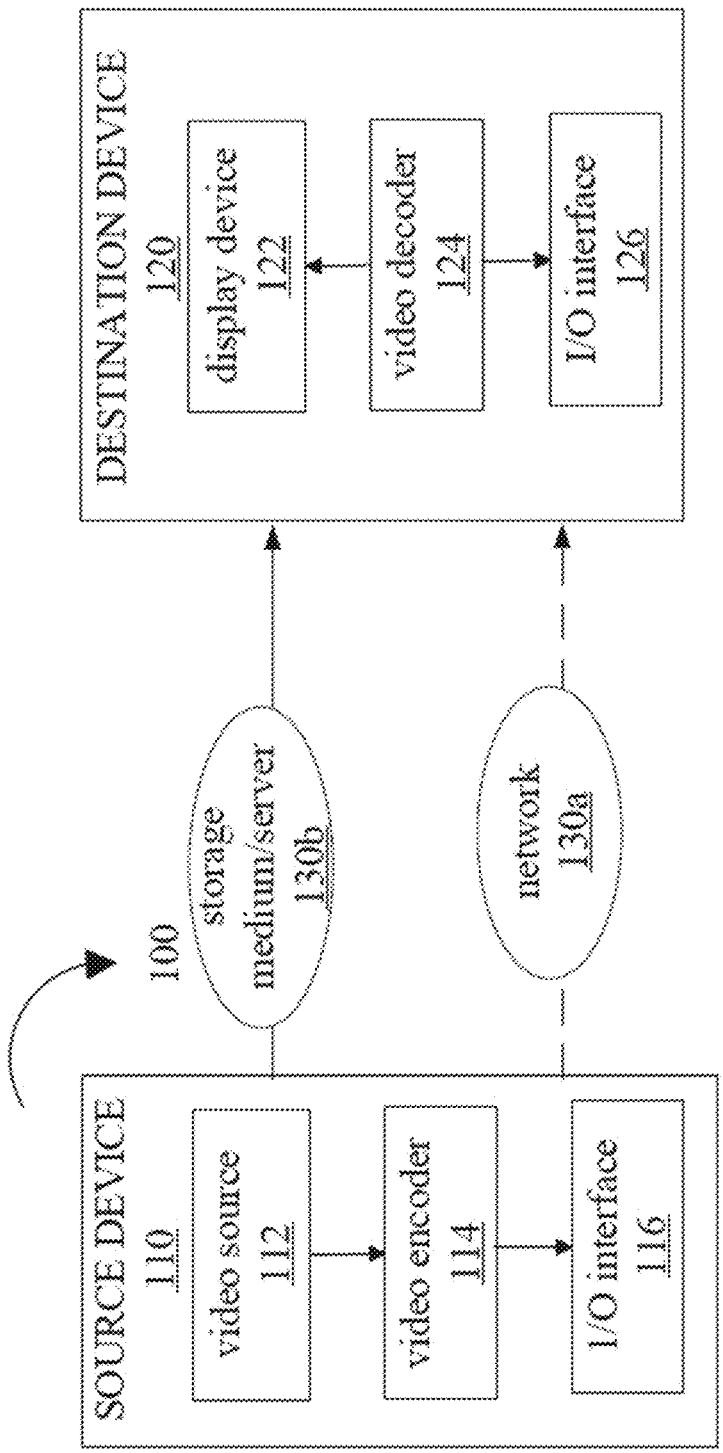
FIG. 8 is a block diagram that illustrates a video coding system in accordance with some embodiments of the present disclosure.

FIG. 8 is a block diagram that illustrates an example video coding system 100 that may utilize the techniques of this disclosure.

As shown in FIG. 8, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 9:
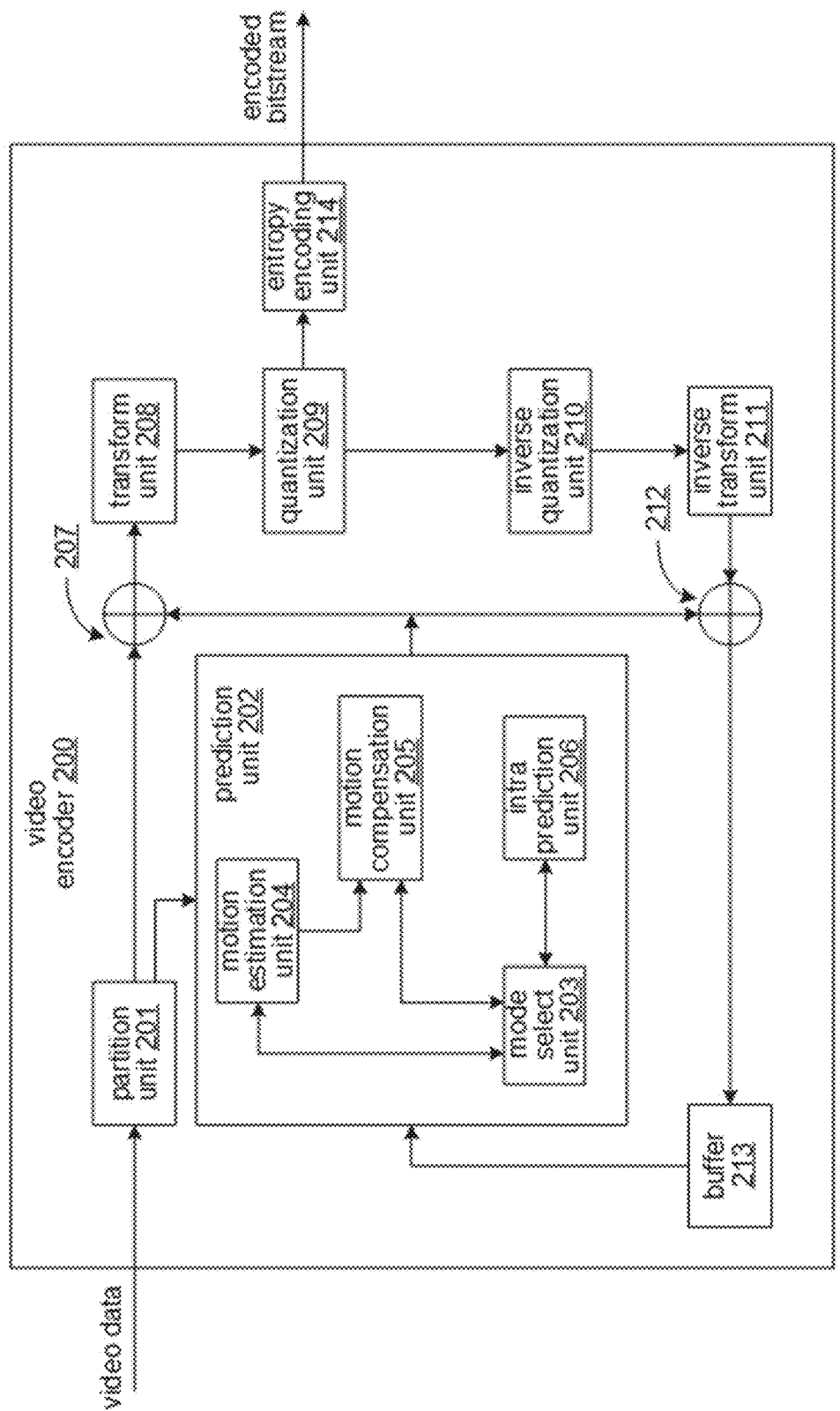
FIG. 9 is a block diagram that illustrates an encoder in accordance with some embodiments of the present disclosure.

FIG. 9 is a block diagram illustrating an example of video encoder 200, which may be video encoder 114 in the system 100 illustrated in FIG. 8.

Video encoder 200 may be configured to perform any or all of the techniques of this disclosure. In the example of FIG. 9, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 9 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 10:
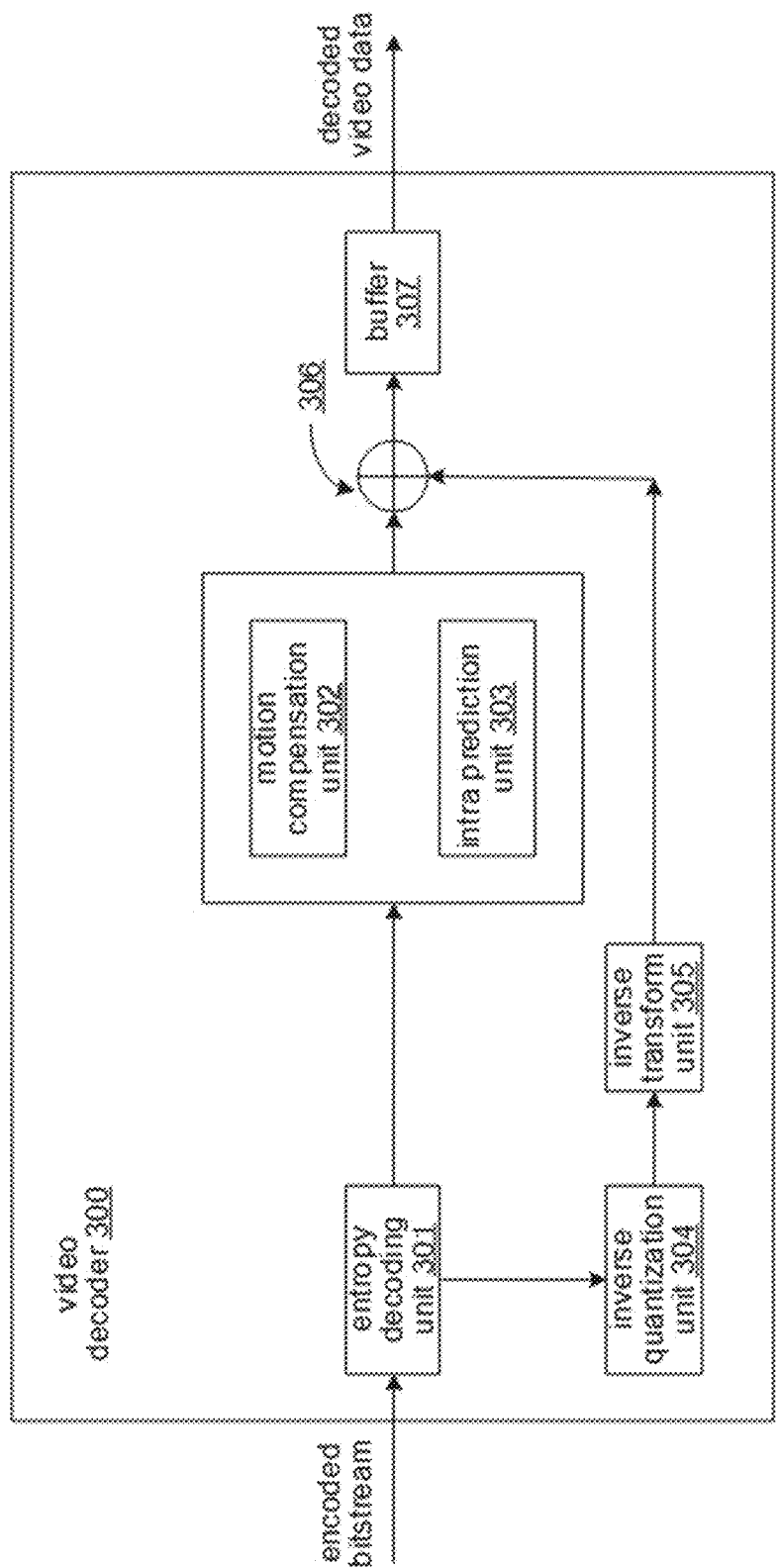
FIG. 10 is a block diagram that illustrates a decoder in accordance with some embodiments of the present disclosure.

FIG. 10 is a block diagram illustrating an example of video decoder 300 which may be video decoder 124 in the system 100 illustrated in FIG. 8.

The video decoder 300 may be configured to perform any or all of the techniques of this disclosure. In the example of FIG. 10, the video decoder 300 includes a plurality of functional components. The techniques described in this disclosure may be shared among the various components of the video decoder 300. In some examples, a processor may be configured to perform any or all of the techniques described in this disclosure.

In the example of FIG. 10, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 9).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of examples preferred by some embodiments is provided next.

The first set of clauses show example embodiments of techniques discussed in the previous section (e.g., item 1).

Figure 7:
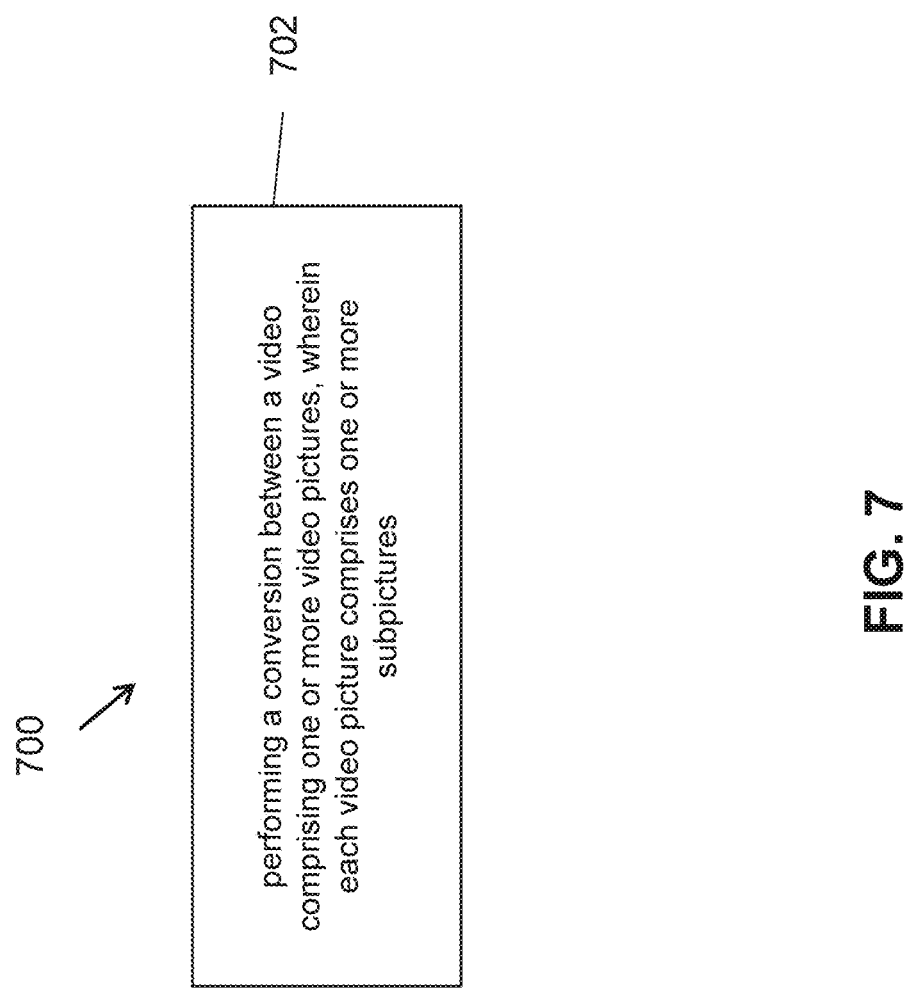
FIG. 7 is a flowchart for an example method of video processing.

1. A video processing method (e.g., method 700 shown in FIG. 7), comprising: performing (702) a conversion between a video comprising one or more pictures comprising one or more subpictures and a coded representation of the video, wherein the coded representation conforms to a format rule that specifies that the one or more pictures comprising one or more subpictures are included in the coded representation according to network abstraction layer (NAL) units, wherein a type NAL unit is indicated in the coded representation includes a coded slice of a particular type of picture or a coded slice of a particular type of a subpicture.

The following clauses show example embodiments of techniques discussed in the previous section (e.g., item 2).

2. A video processing method, comprising: performing a conversion between a video comprising one or more pictures comprising one or more subpictures and a coded representation of the video, wherein the coded representation conforms to a format rule that specifies that two neighboring subpictures with different network abstraction layer unit types will have a same indication of subpictures being treated as pictures flag.

The following clauses show example embodiments of techniques discussed in the previous section (e.g., items 4, 5, 6, 7, 9, 1, 11, 12).

3. A video processing method, comprising: performing a conversion between a video comprising one or more pictures comprising one or more subpictures and a coded representation of the video, wherein the coded representation conforms to a format rule that defines an order of a first type of subpicture and a second type of subpicture, wherein the first subpicture is a trailing subpicture or a leading subpicture or a random access skipped leading (RASL) subpicture type and the second subpicture is of the RASL type or a random access decodable leading (RADL) type or an instantaneous decoding refresh (IDR) type or a gradual decoding refresh (GDR) type subpicture.

4. The method of clause 3, wherein the rule specifies that the trailing subpicture follows an associated intra random access point or a GDR subpicture in an output order.

5. The method of clause 3, wherein the rule specifies that when a picture is a leading picture of an intra random access point picture, the nal_unit_type value for all network abstraction layer units in the picture are equal to RADL_NUT or RASL_NUT.

6. The method of clause 3, wherein the rule specifies that a given subpicture that is a leading subpicture of an IRAP subpicture must also be a RADL or RASL subpicture.

7. The method of clause 3, wherein the rule specifies that a given subpicture that is an RASL subpicture is disallowed to be associated with an IDR subpicture.

8. The method of clause 3, wherein the rule specifies that a given subpicture having a same layer id and a subpicture index as an IRAP subpicture must precede, in an output order, the IRAP subpicture and all associated RADL subpictures thereof.

9. The method of clause 3, wherein the rule specifies that a given subpicture having a same layer id and a subpicture index as an GDR subpicture must precede, in an output order, the GDR subpicture and all associated RADL subpictures thereof.

10. The method of clause 3, wherein the rule specifies that a given subpicture that is an RASL subpicture associated with a CRA subpicture precedes in an output order all RADL subpictures associated with the CRA subpicture.

11. The method of clause 3, wherein the rule specifies that a given subpicture that is an RASL subpicture associated with a CRA subpicture precedes in an output order all IRAP subpictures associated with the CRA subpicture.

12. The method of clause 3, wherein the rule specifies that a given subpicture is a leading subpicture with an IRAP subpicture, then the give subpicture precedes, in a decoding order, all non-leading subpictures associated with the IRAP picture.

The following clauses show example embodiments of techniques discussed in the previous section (e.g., items 8, 14, 15).

13. A video processing method, comprising: performing a conversion between a video comprising one or more pictures comprising one or more subpictures and a coded representation of the video, wherein the coded representation conforms to a format rule that defines a condition under which a first type of subpicture is allowed or disallowed to occur with a second type of subpicture.

14. The method of clause 13, wherein the rule specifies that, in case that there is an IDR subpicture of network abstraction layer type IDR_N_LP, then the coded representation is disallowed to have an RADP subpicture.

15. The method of clause 13, wherein the rule disallows including a picture in a reference list of a picture that comprises a step-wise temporal sublayer access (STSA) subpicture such that the picture preceding a picture comprising the STSA subpicture.

16. The method of clause 13, wherein the rule disallows including a picture in a reference list of a picture that comprises an intra random access point (IRAP) subpicture such that the picture preceding a picture comprising the IRAP subpicture.

17. The method of any of clauses 1 to 16, wherein the conversion comprises encoding the video into the coded representation.

18. The method of any of clauses 1 to 16, wherein the conversion comprises decoding the coded representation to generate pixel values of the video.

19. A video decoding apparatus comprising a processor configured to implement a method recited in one or more of clauses 1 to 18.

20. A video encoding apparatus comprising a processor configured to implement a method recited in one or more of clauses 1 to 18.

21. A computer program product having computer code stored thereon, the code, when executed by a processor, causes the processor to implement a method recited in any of clauses 1 to 18.

22. A method, apparatus or system described in the present disclosure.

A second set of clauses show example embodiments of techniques discussed in the previous section (e.g., items 8-11).

1. A method of video processing (e.g., method 1100 as shown in FIG. 11), comprising: performing 1102 a conversion between a video comprising multiple layers of one or more pictures and a bitstream of the video according to a format rule, and wherein the format rule specifies that a reference picture referred to by each inter-layer reference picture entry in a reference picture list of a slice of a current picture of a current layer satisfies a constraint, wherein the constraint is at least one of: (a) the reference picture is an intra random access (IRAP) picture or (b) the reference picture has a temporal identifier that is less than or equal to a certain value that is a function of a maximum allowed value of a video layer to which slices from the current layer can reference, wherein the maximum allowed value is indicated in a syntax element.

2. The method of clause 1, wherein one or more indexes for the syntax element are layer indexes.

3. The method of clause 1 or 2, wherein the syntax element is a two dimensional syntax element.

4. The method of any of clauses 1 to 3, wherein the temporal identifier is a TemporalId and the syntax element is max_tid_il_ref_pics_plus1[i][j], whereby i and j are integers.

5. The method of any of clauses 1 to 3, wherein the certain value corresponds to a value of Max(0, max_tid_il_ref_pics_plus1[currLayerIdx][refLayerIdx]−1), where currLayerIdx and refLayerIdx are equal to GeneralLayerIdx[nuh_layer_id] and GeneralLayerIdx[refpicLayerId], respectively, GeneralLayerIdx[ ] specifies a layer index of a layer with a particular layer identifier corresponding to nuh_layer_id, and refpicLayerId is a layer identifier of the picture.

6. The method of clause 5, wherein the format rule further specifies that the picture referred to by each inter-layer reference picture entry is present in a decoded picture buffer and has a layer identifier less than that of the current picture.

7. The method of any of clauses 1 to 3, wherein the certain value corresponds to a value of max_tid_il_ref_pics_plus1 [currLayerIdx][refLayerIdx], where currLayerIdx and refLayerIdx are equal to GeneralLayerIdx[nuh_layer_id] and GeneralLayerIdx[refpicLayerId], respectively, GeneralLayerIdx[ ] specifies a layer index of a layer with a particular layer identifier corresponding to nuh_layer_id, and refpicLayerId is a layer identifier of the picture.

8. The method of clause 7, wherein the format rule further specifies that the picture referred to by each inter-layer reference picture entry is present in a decoded picture buffer and has a layer identifier less than that of the current picture.

9. The method of any of clauses 1 to 8, wherein the conversion includes encoding the video into the bitstream.

10. The method of any of clauses 1 to 8, wherein the conversion includes decoding the video from the bitstream.

11. The method of any of clauses 1 to 8, wherein the conversion includes generating the bitstream from the video, and the method further comprises: storing the bitstream in a non-transitory computer-readable recording medium.

12. A video processing apparatus comprising a processor configured to implement a method recited in any one or more of clauses 1 to 11.

13. A method of storing a bitstream of a video, comprising, a method recited in any one of clauses 1 to 11, and further including storing the bitstream to a non-transitory computer-readable recording medium.

14. A computer readable medium storing program code that, when executed, causes a processor to implement a method recited in any one or more of clauses 1 to 11.

15. A computer readable medium that stores a bitstream generated according to any of the above described methods.

16. A video processing apparatus for storing a bitstream, wherein the video processing apparatus is configured to implement a method recited in any one or more of clauses 1 to 11.

A third set of clauses show example embodiments of techniques discussed in the previous section (e.g., item 12).

Figure 12:
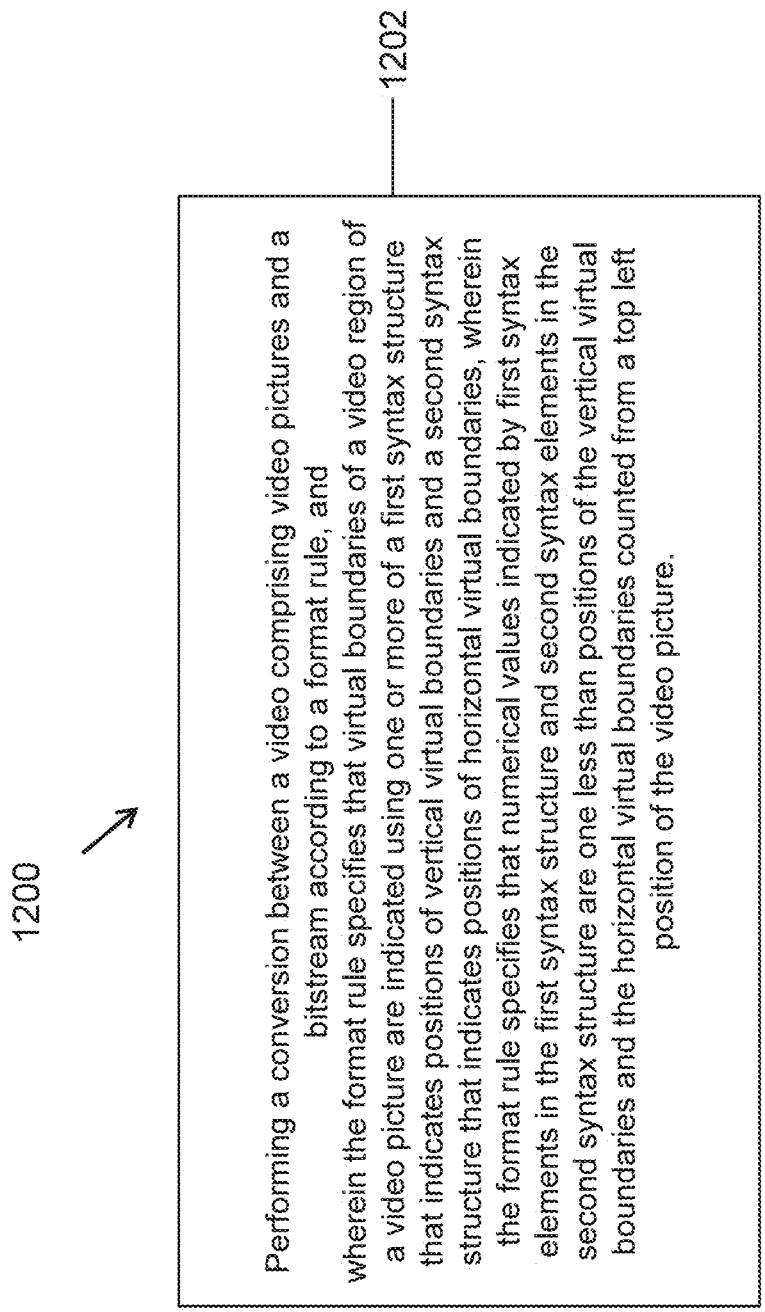
FIG. 12 is a flowchart for an example method of video processing based on some implementations of the disclosed technology.

1. A method of video processing (e.g., method 1200 as shown in FIG. 12), comprising: performing 1202 a conversion between a video comprising video pictures and a bitstream according to a format rule, wherein the format rule specifies that virtual boundaries of a video region of a video picture are indicated using one or more of a first syntax structure that indicates positions of vertical virtual boundaries and a second syntax structure that indicates positions of horizontal virtual boundaries, wherein the format rule specifies that numerical values indicated by first syntax elements in the first syntax structure and second syntax elements in the second syntax structure are one less than positions of the vertical virtual boundaries and the horizontal virtual boundaries counted from a top left position of the video picture.

2. The method of clause 1, wherein the first syntax elements include sps_virtual_boundary_pos_x_minus1[i] and the second syntax elements include sps_virtual_boundary_pos_y_minus1[i], whereby i is an integer.

3. The method of clause 1, wherein the first syntax elements include ph_virtual_boundary_pos_x_minus1[i], and the second syntax elements include ph_virtual_boundary_pos_y_minus1[i], whereby i is an integer.

4. The method of any of clauses 1 to 3, wherein at least one of the first syntax elements and the second syntax elements is coded using a descriptor that is ue(v) or u(v).

5. The method of any of clauses 1-3, wherein the first syntax elements include sps_virtual_boundary_pos_x_minus1[i] plus 1 that specifies a location of an i-th vertical virtual boundary in units of luma samples divided by 8 and has a value in a range of 0 to Ceil(pic_width_max_in_luma_samples÷8)−2, whereby pic_width_max_in_luma_samples indicates a maximum width of a picture in units of luma samples.

6. The method of any of clauses 1-3, wherein the second syntax elements include sps_virtual_boundary_pos_y_minus1[i] plus 1 that specifies a location of an i-th horizontal virtual boundary in units of luma samples divided by 8 and has a value in a range of 0 to Ceil(pic_height_max_in_luma_samples÷8)−2, whereby pic_height_max_in_luma_samples indicates a maximum height of a picture in units of luma samples.

7. The method of any of clauses 1-3, wherein the first syntax elements include ph_virtual_boundary_pos_x_minus1[i] plus 1 that specifies a location of an i-th vertical virtual boundary in units of luma samples divided by 8 and has a value in a range of 0 to Ceil(pic_width_in_luma_samples÷8)−2, whereby pic_width_in_luma_samples indicates a width of a picture in units of luma samples.

8. The method of clause 7, wherein a list, VirtualBoundariesPosX[i] for i ranging from 0 to NumVerVirtualBoundaries−1, in units of luma samples, specifies locations of vertical virtual boundaries, is derived using a following condition: VirtualBoundariesPosX[i]=(sps_virtual_boundaries_present_flag? (sps_virtual_boundary_pos_x_minus1[i]+1) (ph_virtual_boundary_pos_x_minus1[i]+1))*8.

9. The method of clause 8, wherein a distance between any two vertical virtual boundaries is greater than or equal to CtbSizeY luma samples, whereby CtbSizeY indicates a size of a coding tree unit.

10. The method of any of clauses 1-3, wherein the second syntax elements include ph_virtual_boundary_pos_y_minus1[i] plus 1 specifies a location of an i-th horizontal virtual boundary in units of luma samples divided by 8 and has a value in a range of 0 to Ceil(pic_height_in_luma_samples÷8)−2, whereby pic_height_in_luma_samples indicates a height of a picture in units of luma samples.

11. The method of clause 10, wherein a list, VirtualBoundariesPosY[i] for i ranging from 0 to NumVerVirtualBoundaries−1, in units of luma samples, specifies locations of horizontal virtual boundaries, is derived using a following condition: VirtualBoundariesPosY[i]=(sps_virtual_boundaries_present_flag? (sps_virtual_boundary_pos_y_minus1[i]+1): (ph_virtual_boundary_pos_y_minus1[i]+1))*8.

12. The method of clause 11, wherein a distance between any two horizontal virtual boundaries is greater than or equal to CtbSizeY luma samples, whereby CtbSizeY indicates a size of a coding tree unit.

13. The method of any of clauses 1 to 12, wherein the vertical virtual boundaries and the horizontal virtual boundaries correspond to boundaries between a refreshed region and an unrefreshed region within the video picture.

14. The method of any of clauses 1 to 13, wherein the vertical virtual boundaries and the horizontal virtual boundaries correspond to boundaries across which an in-loop filtering is not applied during the conversion.

15. The method of any of clauses 1 to 14, wherein the conversion includes encoding the video into the bitstream.

16. The method of any of clauses 1 to 14, wherein the conversion includes decoding the video from the bitstream.

17. The method of clauses 1 to 14, wherein the conversion includes generating the bitstream from the video, and the method further comprises: storing the bitstream in a non-transitory computer-readable recording medium.

18. A video processing apparatus comprising a processor configured to implement a method recited in any one or more of clauses 1 to 17.

19. A method of storing a bitstream of a video, comprising, a method recited in any one of clauses 1 to 17, and further including storing the bitstream to a non-transitory computer-readable recording medium.

20. A computer readable medium storing program code that, when executed, causes a processor to implement a method recited in any one or more of clauses 1 to 17.

21. A computer readable medium that stores a bitstream generated according to any of the above described methods.

22. A video processing apparatus for storing a bitstream representation, wherein the video processing apparatus is configured to implement a method recited in any one or more of clauses 1 to 17.

In the clauses described herein, an encoder may conform to the format rule by producing a coded representation according to the format rule. In the clauses described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method for processing video data, comprising:
performing a conversion between a video comprising one or more pictures and a bitstream of the video according to a format rule,
wherein the format rule specifies that a first picture referred to by each inter-layer reference picture entry in a reference picture list of a slice of a current picture of a current layer satisfies a constraint,
wherein a first syntax element is included in the bitstream,
wherein the first syntax element is a two dimensional syntax element, and the first syntax element corresponding to an index of the current layer and an index of a reference layer is one of multiple first syntax elements included in the bitstream corresponding to indices of different current layers and indices of different reference layers, respectively, and
wherein the constraint comprises at least one of: (a) the first picture is an intra random access (IRAP) picture or (b) the first picture has a temporal identifier that is less than a value of the first syntax element corresponding to the index of the current layer and the index of a reference layer.

2. The method of claim 1, wherein the first syntax element corresponding to the index of the current layer and the index of a reference layer is represented as max_tid_il_ref_pics_plus1[currLayerIdx][refLayerIdx], where currLayerIdx is equal to GeneralLayerIdx[nuh_layer_id] and refLayerIdx is equal to GeneralLayerIdx[refpicLayerId], where GeneralLayerIdx[ ] specifies a layer index of a layer with a particular layer identifier, nuh_layer_id is a layer identifier of the current picture, and refpicLayerId is a layer identifier of the first picture.

3. The method of claim 2, wherein the format rule further specifies that the first picture referred to by each inter-layer reference picture entry is present in a decoded picture buffer and has a layer identifier less than that of the current picture.

4. The method of claim 1, wherein the value of the first syntax element indicates a maximum allowed value for a temporal identifier of a video layer to which slices from the current layer can reference.

5. The method of claim 1, wherein the format rule further specifies that virtual boundaries of a video region of a second picture are indicated using one or more of second syntax elements that indicates positions of vertical virtual boundaries and third syntax elements that indicates positions of horizontal virtual boundaries,
wherein the format rule further specifies that numerical values indicated by second syntax elements are one less than positions of the vertical virtual boundaries, respectively, and
wherein the format rule further specifies that numerical values indicated by third syntax elements are one less than positions of the horizontal virtual boundaries, respectively.

6. The method of claim 5, wherein the second syntax elements include sps_virtual_boundary_pos_x_minus1[i], and the third syntax elements include sps_virtual_boundary_pos_y_minus1[i],
wherein sps_virtual_boundary_pos_x_minus1[i] plus 1 specifies a location of an i-th vertical virtual boundary in units of luma samples divided by 8,
wherein sps_virtual_boundary_pos_x_minus1[i] has a value in a range of 0 to Ceil(pic_width_max_in_luma_samples÷8)−2, where pic_width_max_in_luma_samples indicates a maximum width of a picture in units of luma samples,
wherein sps_virtual_boundary_pos_y_minus1[i] plus 1 that specifies a location of an i-th horizontal virtual boundary in units of luma samples divided by 8, and
wherein sps_virtual_boundary_pos_y_minus1[i] has a value in a range of 0 to Ceil(pic_height_max_in_luma_samples÷8)−2, where pic_height_max_in_luma_samples indicates a maximum height of a picture in units of luma samples.

7. The method of claim 6, wherein the second syntax elements further include ph_virtual_boundary_pos_x_minus1[i], and the third syntax elements further include ph_virtual_boundary_pos_y_minus1[i],
wherein ph_virtual_boundary_pos_x_minus1[i] plus 1 that specifies a location of an i-th vertical virtual boundary in units of luma samples divided by 8,
wherein ph_virtual_boundary_pos_x_minus1[i] has a value in a range of 0 to Ceil(pic_width_in_luma_samples÷8)−2, where pic_width_in_luma_samples indicates a width of a picture in units of luma samples,
wherein ph_virtual_boundary_pos_y_minus1[i] plus 1 specifies a location of an i-th horizontal virtual boundary in units of luma samples divided by 8, and
wherein ph_virtual_boundary_pos_y_minus1[i] has a value in a range of 0 to Ceil(pic_height_in_luma_samples+8)−2, where pic_height_in_luma_samples indicates a height of a picture in units of luma samples.

8. The method of claim 7, wherein a list, VirtualBoundariesPosX[i] for i ranging from 0 to NumVerVirtualBoundaries−1, in units of luma samples, specifying locations of vertical virtual boundaries, is equal to (sps_virtual_boundary_pos_x_minus1[i]+1) when a syntax flag represented as sps_virtual_boundaries_present_flag is equal to true, and is equal to (ph_virtual_boundary_pos_x_minus1[i]+1))*8 when the syntax flag represented as sps_virtual_boundaries_present_flag is equal to false, and
wherein a distance between any two vertical virtual boundaries is greater than or equal to CtbSizeY luma samples, where CtbSizeY indicates a size of a coding tree unit.

9. The method of claim 7, wherein a list, VirtualBoundariesPosY[i] for i ranging from 0 to NumVerVirtualBoundaries−1, in units of luma samples, specifying locations of horizontal virtual boundaries, is equal to (sps_virtual_boundary_pos_y_minus1[i]+1) when a syntax flag represented as sps_virtual_boundaries_present_flag is equal to true, and is equal to (ph_virtual_boundary_pos_y_minus1[i]+1))*8 when the syntax flag represented as sps_virtual_boundaries_present_flag is equal to false, and
wherein a distance between any two horizontal virtual boundaries is greater than or equal to CtbSizeY luma samples, where CtbSizeY indicates a size of a coding tree unit.

10. The method of claim 7, wherein the second syntax elements and the third syntax elements are coded using a descriptor that is ue(v).

11. The method of claim 5, wherein an in-loop filtering is not applied across the vertical virtual boundaries and the horizontal virtual boundaries.

12. The method of claim 5, wherein the vertical virtual boundaries and the horizontal virtual boundaries correspond to boundaries between a refreshed region and an unrefreshed region within the second picture.

13. The method of claim 1, wherein the conversion includes encoding the video into the bitstream.

14. The method of claim 1, wherein the conversion includes decoding the video from the bitstream.

15. An apparatus for processing video data comprising a processor and a non-transitory memory with instructions thereon, wherein the instructions upon execution by the processor, cause the processor to:
perform a conversion between a video comprising one or more pictures and a bitstream of the video according to a format rule,
wherein the format rule specifies that a first picture referred to by each inter-layer reference picture entry in a reference picture list of a slice of a current picture of a current layer satisfies a constraint,
wherein a first syntax element is included in the bitstream,
wherein the first syntax element is a two dimensional syntax element, and the first syntax element corresponding to an index of the current layer and an index of a reference layer is one of multiple first syntax elements included in the bitstream corresponding to indices of different current layers and indices of different reference layers, respectively, and
wherein the constraint comprises at least one of: (a) the first picture is an intra random access (IRAP) picture or (b) the first picture has a temporal identifier that is less than a value of the first syntax element corresponding to the index of the current layer and the index of a reference layer.

16. The apparatus of claim 15, wherein the first syntax element corresponding to the index of the current layer and the index of a reference layer is represented as max_tid_il_ref_pics_plus1[currLayerIdx][refLayerIdx], where currLayerIdx is equal to GeneralLayerIdx[nuh_layer_id] and refLayerIdx is equal to, GeneralLayerIdx[refpicLayerId], where GeneralLayerIdx[ ] specifies a layer index of a layer with a particular layer identifier, nuh_layer_id is a layer identifier of the current picture, and refpicLayerId is a layer identifier of the first picture, and
wherein the format rule further specifies that the first picture referred to by each inter-layer reference picture entry is present in a decoded picture buffer and has a layer identifier less than that of the current picture.

17. A non-transitory computer-readable storage medium storing instructions that cause a processor to:
perform a conversion between a video comprising one or more pictures and a bitstream of the video according to a format rule,
wherein the format rule specifies that a first picture referred to by each inter-layer reference picture entry in a reference picture list of a slice of a current picture of a current layer satisfies a constraint,
wherein a first syntax element is included in the bitstream,
wherein the first syntax element is a two dimensional syntax element, and the first syntax element corresponding to an index of the current layer and an index of a reference layer is one of multiple first syntax elements included in the bitstream corresponding to indices of different current layers and indices of different reference layers, respectively, and
wherein the constraint comprises at least one of: (a) the first picture is an intra random access (IRAP) picture or (b) the first picture has a temporal identifier that is less than a value of the first syntax element corresponding to the index of the current layer and the index of a reference layer.

18. The non-transitory computer-readable storage medium of claim 17,
wherein the first syntax element corresponding to the index of the current layer and the index of a reference layer is represented as max_tid_il_ref_pics_plus1[currLayerIdx][refLayerIdx], where currLayerIdx is equal to GeneralLayerIdx[nuh_layer_id] and refLayerIdx is equal to, GeneralLayerIdx[refpicLayerId], where GeneralLayerIdx[ ] specifies a layer index of a layer with a particular layer identifier, nuh_layer_id is a layer identifier of the current picture, and refpicLayerId is a layer identifier of the first picture, and
wherein the format rule further specifies that the first picture referred to by each inter-layer reference picture entry is present in a decoded picture buffer and has a layer identifier less than that of the current picture.

19. A method for storing a bitstream of a video, comprising:
generating the bitstream of the video comprising one or more pictures according to a format rule; and
storing the bitstream in a non-transitory computer-readable recording medium,
wherein the format rule specifies that a first picture referred to by each inter-layer reference picture entry in a reference picture list of a slice of a current picture of a current layer satisfies a constraint,
wherein a first syntax element is included in the bitstream,
wherein the first syntax element is a two dimensional syntax element, and the first syntax element corresponding to an index of the current layer and an index of a reference layer is one of multiple first syntax elements included in the bitstream corresponding to indices of different current layers and indices of different reference layers, respectively, and
wherein the constraint comprises at least one of: (a) the first picture is an intra random access (IRAP) picture or (b) the first picture has a temporal identifier that is less than a value of the first syntax element corresponding to the index of the current layer and the index of a reference layer.

20. The method of claim 19, wherein the first syntax element corresponding to the index of the current layer and the index of a reference layer is represented as max_tid_il_ref_pics_plus1[currLayerIdx][refLayerIdx], where currLayerIdx is equal to GeneralLayerIdx[nuh_layer_id] and refLayerIdx is equal to, GeneralLayerIdx[refpicLayerId], where GeneralLayerIdx[ ] specifies a layer index of a layer with a particular layer identifier, nuh_layer_id is a layer identifier of the current picture, and refpicLayerId is a layer identifier of the first picture, and
wherein the format rule further specifies that the first picture referred to by each inter-layer reference picture entry is present in a decoded picture buffer and has a layer identifier less than that of the current picture.

* * * * *